United States Patent
Yamagaki et al.

(10) Patent No.: US 7,369,232 B2
(45) Date of Patent: May 6, 2008

(54) STOKES PARAMETER MEASUREMENT DEVICE AND METHOD

(75) Inventors: Mieko Yamagaki, Tokyo (JP); Yu Mimura, Tokyo (JP); Kazuyou Mizuno, Tokyo (JP); Takeshi Takagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 183 days.

(21) Appl. No.: 11/139,777

(22) Filed: May 31, 2005

(65) Prior Publication Data

US 2005/0270529 A1     Dec. 8, 2005

Related U.S. Application Data

(63) Continuation-in-part of application No. 10/347,842, filed on Jan. 16, 2003, now Pat. No. 6,909,506.

(30) Foreign Application Priority Data

Jan. 17, 2002  (JP)  .................................. 2002-8330
Jul. 10, 2002  (JP)  .............................. 2002-201268

(51) Int. Cl.
    *G01J 4/00*   (2006.01)
(52) U.S. Cl. ..................................................... 356/364
(58) Field of Classification Search ................ 356/364, 356/368
    See application file for complete search history.

(56) References Cited

U.S. PATENT DOCUMENTS

| 5,337,146 | A | 8/1994 | Azzam |
| 5,815,270 | A | 9/1998 | Lee |
| 5,965,874 | A | 10/1999 | Aso et al. |
| 6,177,995 | B1 * | 1/2001 | Compain et al. ........... 356/366 |
| 6,517,479 | B1 | 2/2003 | Sekiya et al. |
| 6,671,045 | B1 | 12/2003 | Lee et al. |
| 2003/0075676 | A1 | 4/2003 | Ruchet et al. |

FOREIGN PATENT DOCUMENTS

| JP | 05-264230 | 10/1993 |
| JP | 06-18332 | 1/1994 |
| JP | 08-220449 | 8/1996 |
| JP | 09-72787 | 3/1997 |
| JP | 11-119009 | 4/1999 |

* cited by examiner

*Primary Examiner*—Roy M. Punnoose
(74) *Attorney, Agent, or Firm*—Oblon, Spivak, McClelland, Maier & Neustadt, P.C.

(57) ABSTRACT

An object is to accurately measure the Stokes parameters, without the occurrence of polarization fluctuations or PDL during the splitting of the incident light. When the incident light is made incident on a first-stage prism, the light is split into two first splitting light rays. Next, the first split light rays are respectively incident on a pair of prisms of a second stage. Each of the pair of first split light rays is split into two rays by a second-stage prism, to obtain four second split light rays.

12 Claims, 18 Drawing Sheets

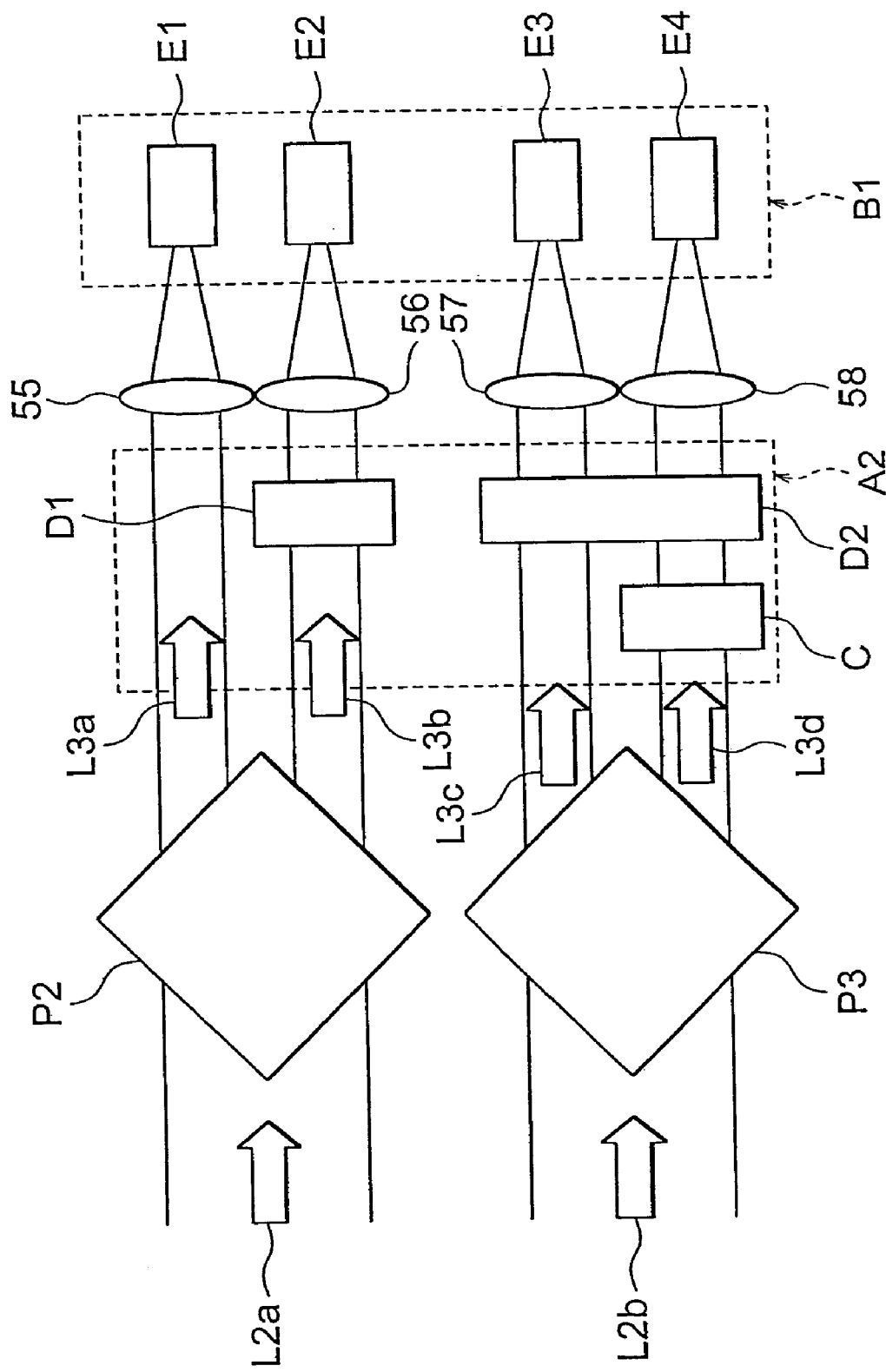

STOKES PARAMETER MEASUREMENT DEVICE AND METHOD

This is a continuation-in part of application Ser. No. 10/347,842 filed on Jan. 16, 2003 now U.S. Pat. No. 6,909,506

BACKGROUND OF THE INVENTION

1. Field of the Invention

This invention relates to a Stokes parameter measurement device which measures the state of polarization of signal light or other light, and the measurement method of same.

2. Description of the Related Art

Stokes parameters are parameters which represent a state of polarization. When measuring Stokes parameters, the incident signal light is split into four rays using a splitter means such as a beam splitter, half-mirror, or filter; each of the signal light rays is given a different polarization and phase by means of a polarizer and a quarter-wave plate or other phase shifter, the optical components of each of the split signal light rays are subjected to photoelectric conversion using photodetector elements, and operations are performed on the electrical components obtained by photoelectric conversion to obtain the Stokes parameters. The configuration of a Stokes parameter measurement device such as that described above is disclosed in Japanese Patent Application Laid-open No. 6-18332.

In such a conventional Stokes parameter measurement device, a beam splitter, half-mirror, filter, or other device is used as splitter means to split the incident light. Using such splitter means, because the incident light is split by means of interference, polarization fluctuations and a PDL (polarization-dependent loss) occur. As a result, there is the problem that high-precision measurement of Stokes parameters is difficult.

SUMMARY OF THE INVENTION

This invention was devised in light of the above problems with the prior art, and has as an object the provision of a device and method for the accurate measurement of Stokes parameters, without the occurrence of polarization fluctuations or PDL during splitting of the incident light.

A further object of this invention is to provide a Stokes parameter measurement device comprising an incidence portion, on which the signal light for measurement is incident; an optical splitter portion, having at least one prism, and which splits signal light which has passed through the incidence portion into at least four split rays; a phase compensation portion, which applies different polarizations and phases to each of the split signal light rays; and a photodetector circuit portion, which converts the optical component of the light signal output from the phase compensation portion into an electrical signal. It is preferable that, in the above Stokes parameter measurement device, an operation portion is provided which performs operations on the electrical component signal obtained by photoelectric conversion to obtain the optical intensity, 0° linear-polarization component, 45° linear-polarization component, and right-circular-polarization component, which are the Stokes parameters.

In the above Stokes parameter measurement device, signal light which has passed through the incidence portion is split into at least four rays by the optical splitter portion having at least one prism, without using interference; hence polarization fluctuations and PDL can easily be suppressed, and high-precision measurements of Stokes parameters can be performed.

Another object of this invention is to provide another Stokes parameter measurement device comprising an incidence portion, on which the signal light to be measured is incident; an optical splitter portion, which splits signal light which has passed through the incidence portion into at least four rays; a phase compensation portion, which endows each of the split signal light rays with different polarizations and phases; a photodetector circuit portion, which performs photoelectric conversion of the optical component of the signal light rays emitted from the phase compensation portion; and, an operation circuit portion which performs operations on the electrical component resulting from photoelectric conversion, to obtain an optical intensity, 0° linear polarization component, 45° linear polarization component, and right circular polarization component, which are the Stokes parameters; the optical splitter portion has at least one prism, in the at least one prism, in which a pair of edges (or incidence-side optical surfaces) extending from an edge of the prism, the angle which is generated by each one of the pair of edges and the optical axis of the signal light is larger than 45° respectively, and the signal light, having passed through the incidence portion, is caused to be incident on the plural faces (or incidence-side optical surfaces) to split the signal light.

In the above Stokes parameter measurement device, in the shape of the prism, the angles generated by the pair of edges (incidence-side optical surface) and the optical axis of the signal light are larger than 45°. The greater each incident angle becomes, the greater the difference of reflectance resulting form polarization state or polarization direction occurs, even if AR coating is applied. As a result, the PDL becomes greater especially in the case of the suppression of the PDL in the wide wave range. The PDL is caused to deteriorate the precision of the DOP (the precision of the Stokes parameter measurement) Consequently, in this invention, the incident angles should be under 45°, that is, the angles generated by the incidence-side optical surfaces and the optical axis should be greater than 45°. Making the incident angles smaller, the PDL which occurs when the incident signal light is split can be suppressed and the precision of the DOP (the precision of the Stokes parameter measurement) can be improved in the wide wave range.

Another object of this invention is to provide another Stokes parameter measurement device comprising an incidence portion, on which the signal light to be measured is incident; an optical splitter portion, which splits signal light which has passed through the incidence portion into at least four rays; a phase compensation portion, which endows each of the split signal light rays with different polarizations and phases; a photodetector circuit portion, which performs photoelectric conversion of the optical component of the signal light rays emitted from the phase compensation portion; and, an operation circuit portion which performs operations on the electrical component resulting from photoelectric conversion, to obtain an optical intensity, 0° linear polarization component, 45° linear polarization component, and circular polarization component, which are the Stokes parameters; the optical splitter portion has at least one prism, in the at least one prism, a half-wave plate is inserted.

In the above Stokes parameter measurement device, the polarization component of the signal light which oscillates in the plane perpendicular to the incidence-side optical surface, and the component which oscillates in the perpendicular direction to the former polarization component can both rotate 90° with the half-wave plate. The PDL is caused by the difference of the reflectance when the above mentioned two components are incident to the optical splitter portion. Therefore, rotating polarization state by 90° for both components can cancel out the PDL which has occurred when the signal light is incident to the optical splitter. In other words, the PDL of the signal light emitted from the optical splitter can be suppressed.

In a preferred aspect of the above device, the above optical splitter portion causes the signal light which has passed through the above incidence portion to be incident on two faces containing an edge formed in the above one or more prisms, to split the signal light. In this case, the prism edge can be used to obtain split light rays in an arbitrary splitting ratio.

In another preferred aspect of the above device, the above optical splitter portion comprises a single prism having a quadrangular-pyramid shaped light-receiving portion on the incidence side; signal light having passed through the above incidence portion is caused to be incident on the four side faces of this light-receiving portion, to split the signal light into four rays. In this case, the signal light can be split into four rays by means of a simple configuration using a single prism. This single prism has a quadrangular-pyramid shaped light-emission portion on the emission side; by arranging the four side faces of the above light-receiving portion to be parallel respectively to the opposing four side faces of the above light-emission portion, the light split into four rays can be caused to be emitted at once, all parallel to the incident light.

In still another preferred aspect of the above device, the above optical splitter portion comprises one or more prisms, with opposing faces formed in parallel. In this case, split light rays emitted parallel to the incident light can be obtained.

In still another preferred aspect of the above device, the above phase compensation portion comprises a phase shifter and a polarizer.

In still another preferred aspect of the above device, a condensing lens is positioned between the above phase compensation portion and the above photodetector circuit portion.

In still another preferred aspect of the above device, the above optical splitter portion comprises a first splitter portion and a second splitter portion; the first splitter portion comprises a single prism, and the second splitter portion comprises two prisms.

In still another preferred aspect of the above device, the above optical splitter portion further comprises a dividing portion which causes signal light which has passed through the above incidence portion to be partially emitted, without passing through the above phase compensation portion or the above photodetector circuit portion. In this case, signal light being measured by the Stokes parameter measurement device can be monitored using another device.

In still another preferred aspect of the above device, the above optical splitter portion comprises a wavelength dispersion correction portion, which cancels the wavelength dependence of the emission position of signal light split by the above one or more prisms. In this case, Stokes parameters can be measured over a plurality of wavelengths, without modifying the placement of the photodetector circuit portion or other portions.

A further object of this invention is to provide a Stokes parameter measurement method in which the signal light for measurement is caused to be incident from an incidence portion; the incident signal light is split into four rays by an optical splitter portion, comprised of one or more prisms; if necessary, the polarization state of each of the split signal light rays is rotated 90°; and each of the split signal light rays which extracted from the optical splitter portion is endowed with a different polarization and phase by the phase compensation portion; the optical component of the signal light from a phase compensation portion is photoelectrically converted into an electrical signal by a photodetector circuit portion; and operations are performed by an operation portion on the electrical component signal converted from the optical signal to obtain the optical intensity, 0° linear-polarization component, 45° linear-polarization component, and right-circular-polarization component, which are the Stokes parameters.

In the above Stokes parameter measurement method, polarization fluctuations and PDL can easily be suppressed, so that high-precision measurement of Stokes parameters is possible.

In a preferred aspect of the above method, the above optical splitter portion comprises a first splitter portion and a second splitter portion; signal light incident from an incidence portion is split into two rays in the first splitter portion, and the signal light split into two rays is further split into two rays each in the second splitter portion.

In a preferred aspect of the above method, in the above optical splitter portion, signal light which has passed through the above incidence portion is caused to be incident on two faces containing an edge formed in the above one or more prisms, to split the signal light.

BRIEF DESCRIPTION OF THE DRAWINGS

FIG. 7 shows the state of arrangement of lenses between the phase compensation portion and the photodetector circuit portion;

DESCRIPTION OF THE PREFERRED EMBODIMENTS

Figure 1:
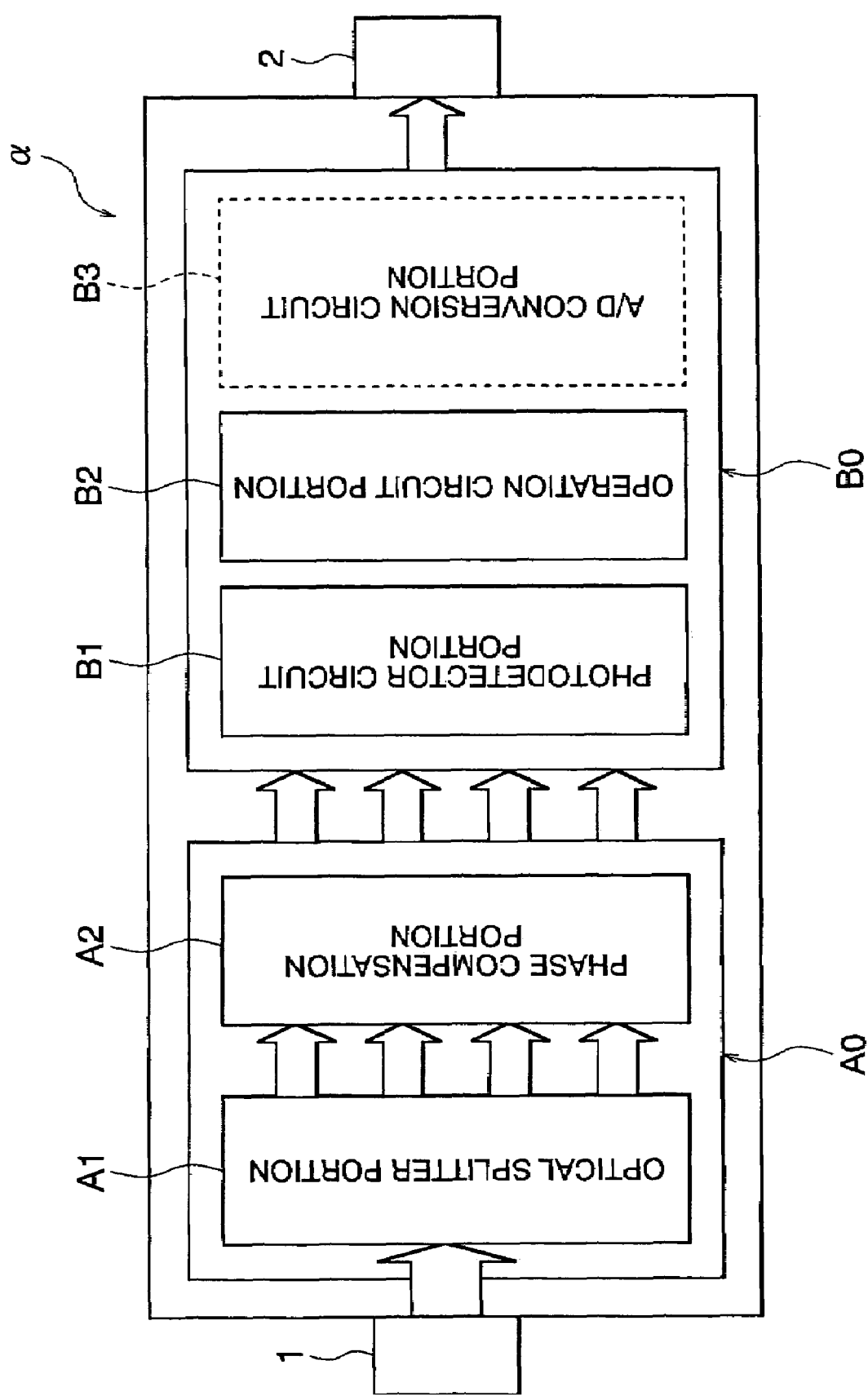
FIG. 1 is a block diagram showing the configuration of the measurement device of a first embodiment.

Below, embodiments of this invention are explained, referring to the drawings.

First Embodiment

FIG. 1 is a block diagram showing the configuration of the Stokes parameter measurement device of a first embodiment.

The Stokes parameter measurement device a of this example comprises an input portion 1, which is an incidence portion comprising a receptacle, collimating lens or similar; a polarization analyzer optical portion A0; an electrical circuit portion B0; an output portion 2 comprising a GP-IB or other. The polarization analyzer optical portion A0 comprises an optical splitter portion A1 and a phase compensation portion A2; the electrical circuit portion B0 comprises a photodetector circuit portion B1, employing a photodiode or similar and an operation circuit portion B2. Note that, if necessary the electrical circuit portion B0 comprises the A/D conversion circuit portion B3 and/or the analog output circuit portion (not shown).

Figure 2:
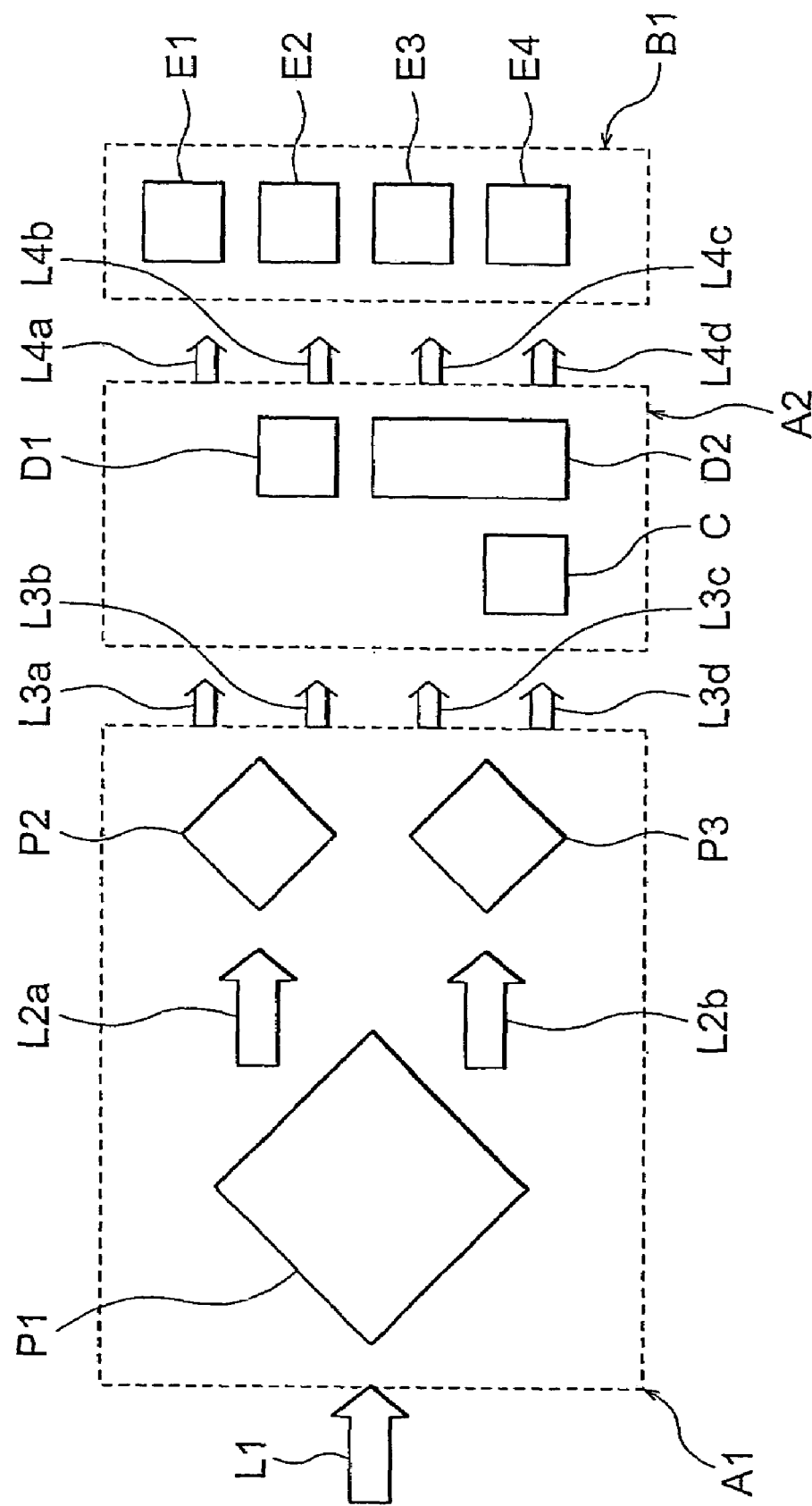
FIG. 2 shows one example of the configuration of the optical splitter portion, phase compensation portion, and photodetector circuit portion of FIG. 1.

FIG. 2 shows one example of the configuration of the optical splitter portion A1, phase compensation portion A2, and photodetector circuit portion B1 of FIG. 1.

The optical splitter portion A1 comprises three cuboidal prisms P1, P2, P3, arranged in a two-dimensional array. In this example, the first splitter portion comprises the prism P1, and the second splitter portion comprises the prisms P2 and P3. The former of these, prism P1, is positioned such that the vicinity of the center of the beam diameter of the incident light L1 passes through the edge of the apex angle. Consequently the incident light L1 is split with a splitting ratio (intensity ratio) of 1:1 by the two faces containing the edge of the prism P1. The pair of prisms P2 and P3 are positioned such that the vicinities of the centers of the beam diameters of the first split light rays L2a, L2b emitted from the prism P1 pass through the edges of the respective apex angles. Consequently, the first split light rays L2a, L2b emitted from the prism P1 are each split with a splitting ratio of 1:1 by the two faces containing the edges of each of the prisms P2, P3.

In other words, the signal light splitting ratio is determined by the positioning of each of the prisms P1, P2, P3, and by the portions of the prisms P1, P2, P3 on which the beam diameter centers of the incident light L1 and the first split light rays L2a, L2b are incident. As described above, in this embodiment the incident light L1 and the first split light rays L2a, L2b are made incident such that the beam diameter centers are positioned on the edges of the apex angles of the prisms P1, P2, P3, so that the second split light rays L3a, L3b, L3c, L3d are the result of splitting the incident light equally into four parts, with a splitting ratio of 1:1:1:1.

Figure 3:
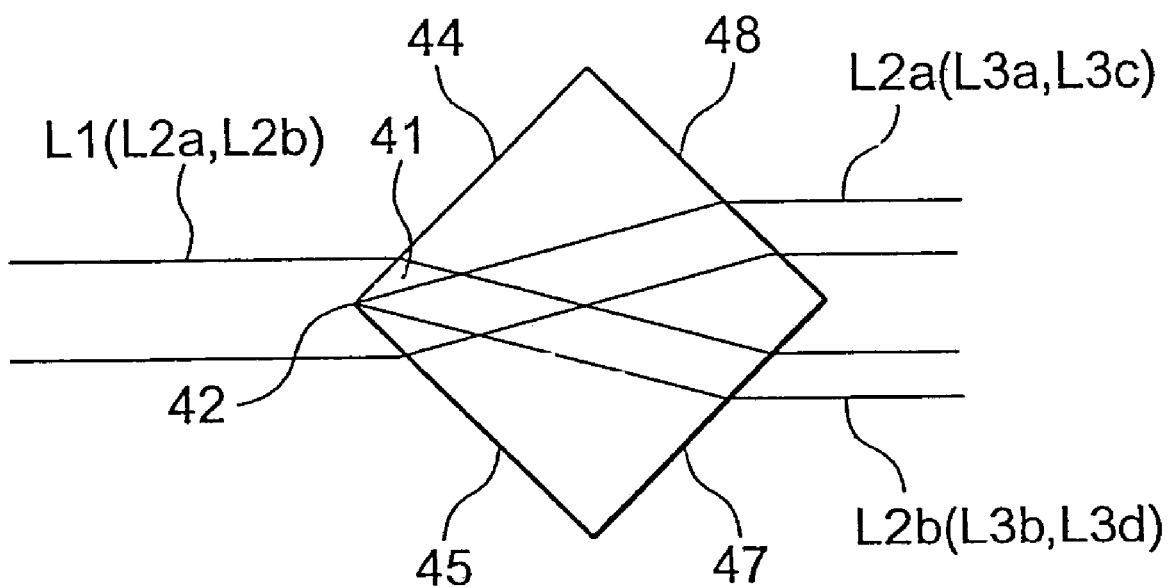
FIG. 3 shows split optical paths within a prism.

FIG. 3 explains in detail the splitting of signal light in a prism P1. This prism P1 has a cuboid external shape, with a square cross-section in the plane parallel to the plane of the paper. The signal light incident on the apex angle portion 41 of the prism P1, that is, the incident light L1, is incident equally on the pair of side faces 44, 45 containing the edge 42 formed in the apex angle portion 41, and is split into two in the plane parallel to the plane of the paper. These two split light rays each propagate along different optical paths within the prism P1, and are emitted separately as light emitted from the pair of opposing side faces 47, 48, that is, as the split light rays L2a, L2b. The pair of light rays which have been split and are emitted from the opposing side faces 47, 48 are refracted upon emission from the prism P1, becoming parallel to the incident light. The above explanation applies to the prism P1; but in the prisms P2 and P3 also, the incident light rays, that is, the first split light rays L2a, L2b are split in a manner similar to that described above, and are emitted as emitted light rays, that is, as the second split light rays L3a to L3d.

It is not necessary to set the splitting ratio for signal light in each of the prisms P1 to P3 to 1:1. That is, the beam diameter centers of the incident light L1 and of the first split light rays L2a, L2b need not be positioned so as to be incident on the edge of the apex angles of the respective prisms P1, P2, P3. When the splitting ratio is not 1:1, the splitting ratio is measured in advance, and compensating calibration data corresponding to the splitting ratio is provided to the operation circuit portion B2.

In FIGS. 4A to 4D are drawings explaining variations of the prisms P1 to P3. That is, the prisms P1 to P3 shown in FIG. 2 are replaced by prisms P with the shapes shown in A through D in FIGS. 4A to 4D.

Figure 4A:
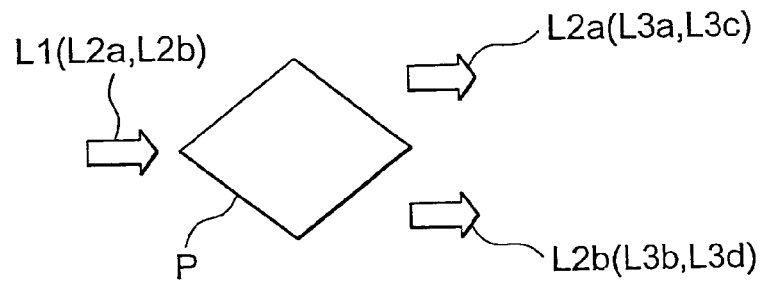
FIGS. 4A to 4D show variations of the prism structure used in the splitter optical path of FIG. 2.
Figure 4B:
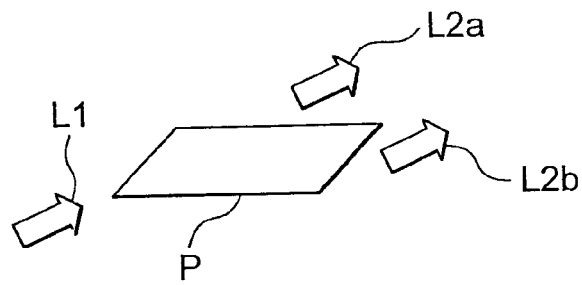

For example, prisms with a rhomboid-shape cross-section or with a parallelogram cross-section, as in FIGS. 4A and 4B, may be used. In such a prism P with a rhomboid or parallelogram cross-sectional shape with parallel opposing faces, the emitted light rays L2a, L2b are always parallel to the incident light ray L1, so that it is easy to position polarizers or phase shifter in the phase compensation portion A2.

Figure 4C:
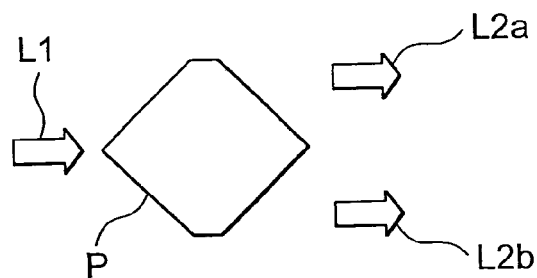
Figure 4D:
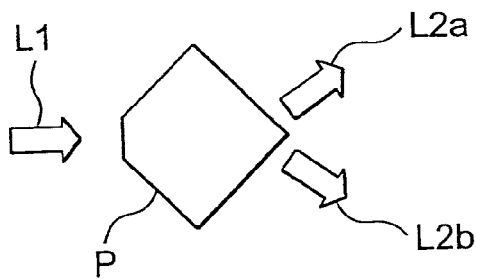

As shown in FIG. 4C, the shape of the prism P may also have a cross-section which is substantially square, but with the corners through which light does not pass removed. Using the shape of the prism in FIG. 4C, the device can be made more compact. And, as shown in FIG. 4D, the prism P may have a shape in which the apex angle of the incident portion is removed, so that when signal light is emitted from the prism P it is caused to branch into different directions.

Returning to FIG. 2, the phase compensation portion A2 comprises a phase shifter C, comprising a quarter-wave plate or similar with principal axis direction at 0°; a polarizer D1, having a polarization direction angle of 0°; and a polarizer D2, having a polarization direction angle of 45°.

The principal axis direction of the phase shifter C and polarization direction angles of the polarizers D1, D2 can be changed as appropriate, and are not particularly limited to the above principal axis direction or polarization direction angles.

The phase shifter C is positioned so as to transmit only the lowermost second split light ray L3d among the second split light rays L3a, L3b, L3c, L3d split by the optical splitting portion A1; however, the phase shifter C can be positioned so as to transmit only one of the other second split light rays L3a to L3c instead. However, this phase shifter C should be positioned in combination with the polarizer D2, described below, so that the placement of the polarizers D1, D2 must be changed according to any changes in the placement of the phase shifter C.

The polarizer D1 is placed such that, among the second split light rays L3a, L3b, L3c, L3d resulting from splitting into four parts, only the second split light ray L3b passes through. However, the second split light ray L3b passing through the polarizer D1 is assumed not to pass through the phase shifter C. The polarizer D2 is placed such that, among the second split light rays L3a, L3b, L3c, L3d resulting from splitting into four parts, only the second split light rays L3c and L3d pass through. Of the two second split light rays L3c, L3d passing through the polarizer D2, one of the second split light rays, L3c, is incident on the polarizer D2 without passing through the phase shifter C, while the other second split light ray L3d passes through the phase shifter C before being incident on the polarizer D2. Of the second split light rays L3a, L3b, L3c, L3d resulting from splitting into four parts, one of the second split light rays L3a does not pass through anything in the phase compensation portion A2, but is incident on the photodetector circuit portion B1 without change.

The signal light rays L4a, L4b, L4c, L4d emitted from the phase compensation portion A2 are incident on the respective photodetector elements E1, E2, E3, E4 constructing the photodetector circuit portion B1, and the transmitted optical intensities of each of the signal light rays are measured. As the photodetector elements E1, E2, E3, E4, for example, photodiodes or other photoelectric conversion devices are used.

Next, the method of measurement of the Stokes parameter device of this embodiment is explained in detail, referring to FIGS. 1 and 2.

First, the incident light ray L1 from the incidence portion 1 is incident on the polarization analyzer portion A0. The incident light ray L1 is incident on the prism P1 of the optical splitter portion A1. When incident on the prism P1, the incident light ray L1 is split into two first split light rays L2a, L2b. Next, the first split rays L2a, L2b are incident on the prisms P2, P3, respectively. The first split rays L2a, L2b are then split into four second split rays L3a, L3b, L3c, L3d by the prisms P2, P3 respectively. In this embodiment, a method is used in which the incident light ray L1 which is the signal light is split into four by the three prisms P1, P2, P3; hence the PDL and polarization fluctuations which occur when performing splitting by conventional means using interference can be suppressed.

The four second split rays L3a, L3b, L3c, L3d are next incident on the phase compensation portion A2. The first of the second split rays L3a does not pass through anything, and is incident on the photodetector element E1 in the same unchanged state, and the transmitted optical intensity is measured. The second of the second split rays L3b passes through the polarizer D1, which has a polarization direction angle of 0°, and is then incident on the photodetector element E2, so that the transmitted optical intensity of the 0° linear polarization component is measured. The third of the second split rays L3c passes through the polarizer D2 having a 45° polarization direction angle, and is incident on the photodetector element E3, so that the transmitted optical intensity of the 45° linear polarization component is measured. The fourth of the second split rays L3d is first incident on a λ/4 wavelength plate having the fast axis at 0°, and is then incident on the polarizer D2 having a polarization direction angle of 45°, before finally being incident on the photodetector element E4, so that the transmitted optical intensity of the right circularly-polarized component is measured.

If the four transmitted optical intensities are It, Ix, I45, and Iq45, then it is known that the Stokes parameters S0, S1, S2, S3 can be represented as in eq. (1) below.

$$\left. \begin{array}{l} S_0 = It \\ S_0 = 2Ix - It \\ S_0 = 2I45 - It \\ S_0 = 2Iq45 - It \end{array} \right\} \quad (1)$$

That is, by measuring the four transmitted optical intensities, the Stokes parameters can be calculated.

For the transmitted optical intensities It, Ix, I45, Iq45, the values measured by photoelectric conversion are taken to be $I_0, I_1, I_2, I_3$ in computing the Stokes parameters. The prisms are placed such that the signal light splitting ratio results in four second split rays of substantially equal optical intensity; however, depending on loss of the polarizers, quarter-wave plate, quarter-wave plate wavelength characteristics and other factors, intensity ratios may differ. Hence it is desirable that correction calculation functions be incorporated into the operation circuit portion B2.

Figure 5:
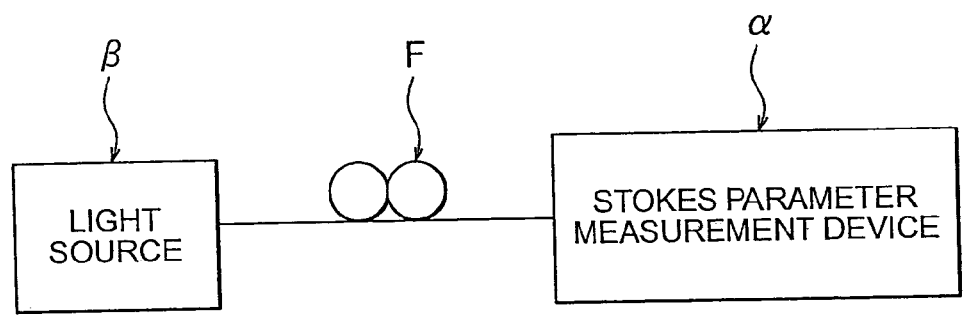
FIG. 5 explains the method for performing compensating calibration in the measurement device of FIG. 1.

The splitting ratio may be measured in advance prior to inserting polarizers and other components; but it is preferable that a compensating calibration method such as that of FIG. 5 be performed. That is, an input light source β capable of emitting completely polarized light is prepared, and while changing the state of polarization of the completely polarized light from the input light source β via a polarization controller F, the light is input to the Stokes parameter measurement device α. Because the light input to the Stokes parameter measurement device α is completely polarized, for each transmitted optical intensity, it can be stipulated that the Stokes parameter at the maximum value is 1, and the Stokes parameter at the minimum value is −1. If the maximum values of $I_0, I_1, I_2, I_3$ are respectively $I_{0max}, I_{1max}, I_{2max}, I_{3max}$, and the minimum values are $I_{0min}, I_{1min}, I_{2min}, I_{3min}$, then when the overall intensity is the transmitted intensity of the input light $I_0$, the Stokes parameter are as given by eq. (2).

$$S_0 = 1 \qquad (2)$$
$$S_i = \frac{I_i}{I_0} \times \frac{I_{0\,max} + I_{0\,min}}{I_{i\,max} - I_{i\,min}} - \frac{I_{i\,max} + I_{i\,min}}{I_{i\,max} - I_{i\,min}}$$
$$(i = 1, 2, 3)$$

The degree of polarization (DOP) is calculated as in eq. (3):

$$DOP = \frac{\sqrt{S_1^2 + S_2^2 + S_3^2}}{S_0} \quad (3)$$

Hence the Stokes parameter measurement device can also be made to function as a DOP monitor.

In this way, the Stokes parameters and DOP value can be calculated; by means of this method, the PDL in the polarization analyzer optical portion can be kept small, so that a Stokes parameter measurement device, that is, a polarization analyzer, with good precision can be configured.

Second Embodiment

Below, the Stokes parameter measurement device of a second embodiment is explained. In the measurement device of the second embodiment, lenses to adjust the beam size are added to the polarization analyzer optical portion A0 shown in FIG. 2.

Figure 6:
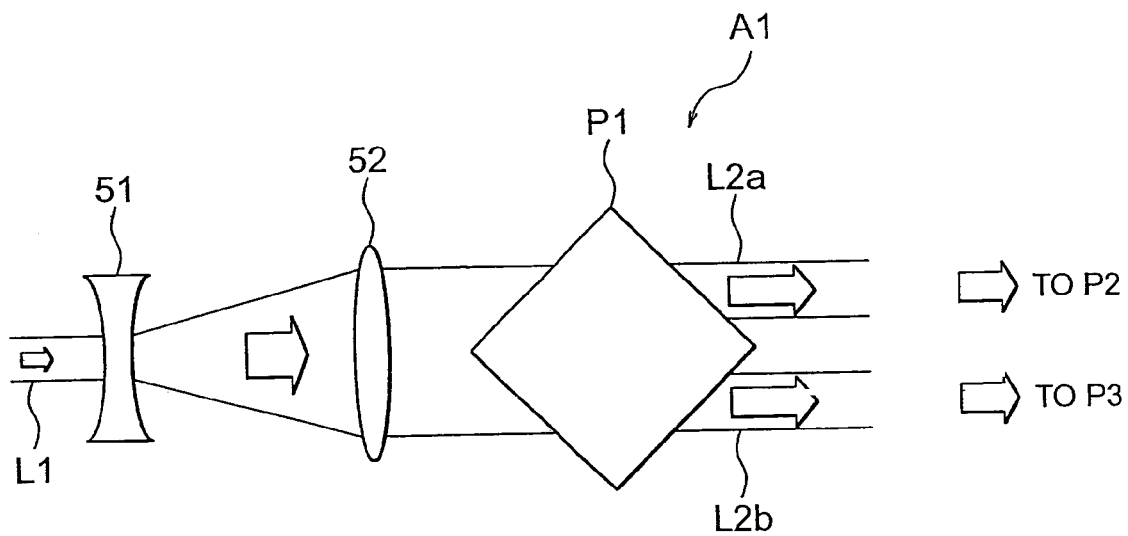
FIG. 6 is a portion of the optical splitter portion in the measurement device according to a second embodiment of the present invention, and shows the placement of lenses in the optical splitter portion.

FIG. 6 shows a portion of the optical splitter portion A1 in the measurement device of the second embodiment. As is clear from the figure, in the optical splitter portion A1, a beam expander lens 51 to enlarge the beam diameter of the incident light ray L1 and a collimator lens 52 to cause the incident light ray L1 with enlarged beam diameter to be collimated before incidence on the prism P1 are positioned sequentially as a stage preceding the prism P1.

FIG. 7 shows an example in which condensing lenses 55, 56, 57, 58 are placed between the photodetector circuit portion B1 and the phase compensation portion A2. Here, after the second split light rays L3a, L3b, L3c, L3d have passed through the phase compensation portion A2, prior to incidence on the photodetector elements E1, E2, E3, E4, the second split light rays L3a, L3b, L3c, L3d are converged by the condensing lenses 55, 56, 57, 58. By thus positioning these condensing lenses 55, 56, 57, 58, the light reception efficiency of the photodetector elements E1, E2, E3, E4 is improved, and precision is stabilized.

Third Embodiment

Below, the Stokes parameter measurement device of a third embodiment is explained. In the measurement device of the third embodiment, the optical splitter portion A1 of FIG. 2 comprises a single prism.

Figure 8A:
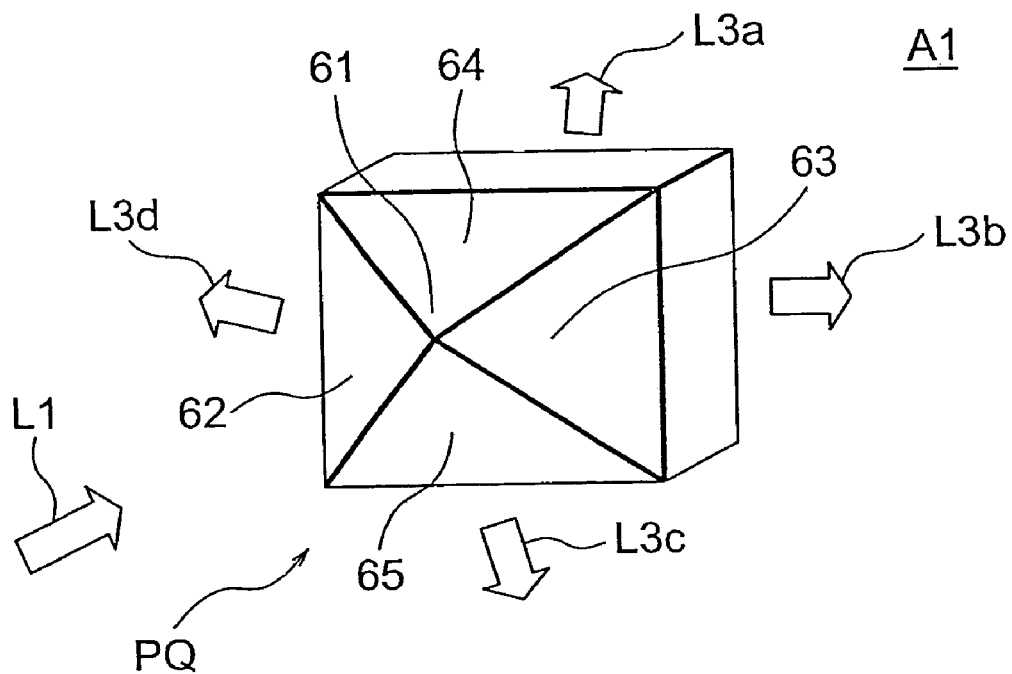
FIG. 8A is a perspective view and FIG. 8B is a side view explaining the construction of the optical splitter portion of the measurement device according to a third embodiment of the present invention.
Figure 8B:
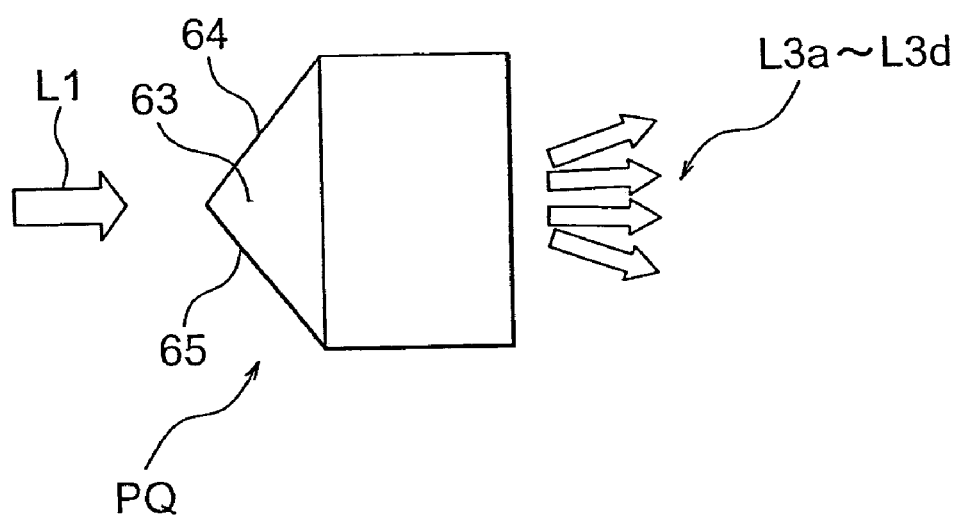

In FIG. 8A is a perspective view of the prism PQ comprised by the optical splitter portion A1, and FIG. 8B is a side view of the prism PQ. In the optical splitter portion A1, the light-receiving portion of the prism PQ is a quadrangular-pyramid shape. The incident light L1 from the input portion 1 shown in FIG. 1 is incident on the apex portion 61 of this pyramid shape, that is, on the four side faces 62 to 65 containing four edges; as a result, a single prism PQ can split the incident light L1 into four split light rays L3a to L3d in a single operation. Hence the configuration of the optical splitter portion A1 can be simplified.

Figure 9A:
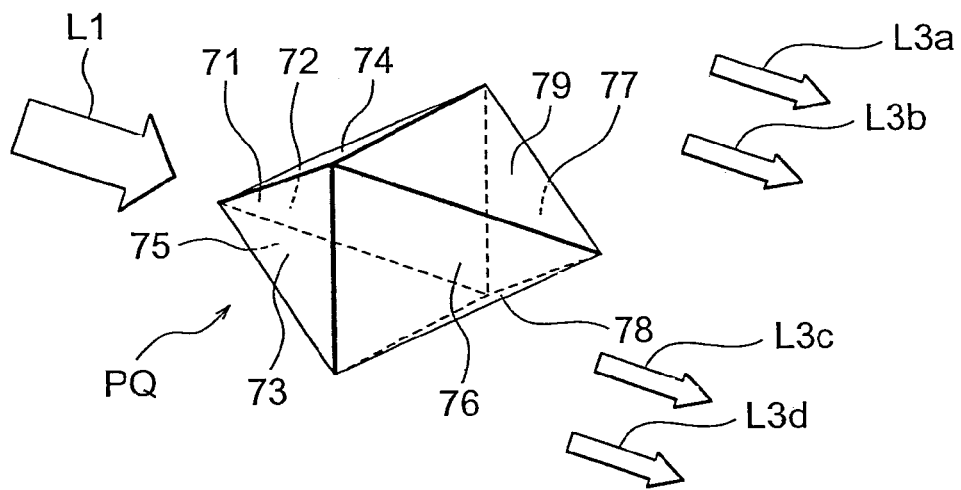
FIGS. 9A and 9B are perspective views explaining the construction of an optical splitter portion of the measurement device according to a fourth embodiment of the present invention.

In FIG. 9A shows a variation of the prism PQ of FIG. 8A and 8B. In this case, the incidence side and the emission side of the prism PQ both have a pyramid shape. In this prism PQ, by causing the incident light L1 to be incident on the four side faces 72 to 75 of the apex portion 71, four split light rays L3a to L3d can be caused to be emitted from the side faces 76 to 79 parallel to and opposing the side faces 72 to 75. At this time, each of the split light rays L3a to L3d is parallel to the incident light ray L1, so that the design of the Stokes parameter measurement device can be made compact. Also, by using such a prism PQ, the split light rays can be output with the same splitting ratio even when the wavelength of the incident light is changed.

Figure 9B:
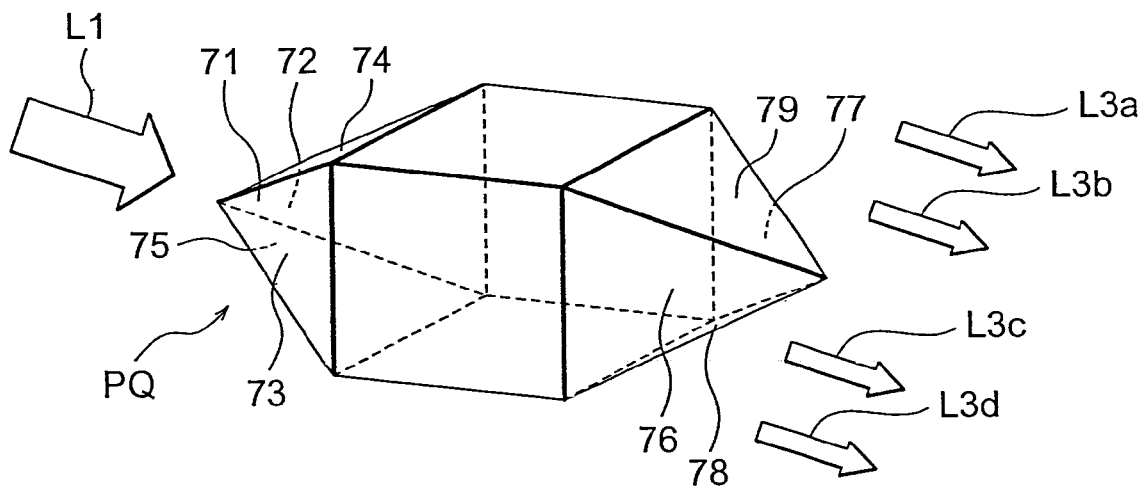

FIG. 9B shows another variation on the prism PQ shown in FIG. 9A. Here, a quadrangular column portion is formed between the pyramid shape on the incidence side and the pyramid shape on the emission side. In this case, split light rays can be obtained with good efficiency according to the refractive index of the prism PQ, and in addition the size of the prism PQ in the direction perpendicular to the optical path, that is, the axis, can be reduced.

Fourth Embodiment

Below, the Stokes parameter measurement device of a fourth embodiment is explained. The measurement device of the fourth embodiment is a further variation of the measurement device of the third embodiment.

Figure 10A:
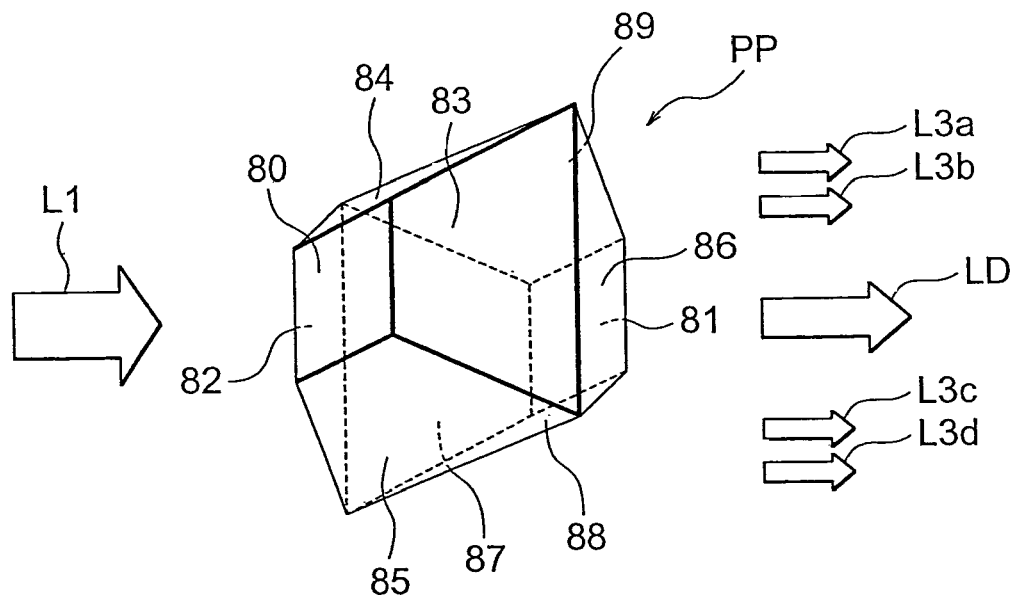
FIGS. 10A and 10B are perspective views explaining the construction of an optical splitter portion of the measurement device according to a fifth embodiment of the present invention.

In FIG. 10A, the prism PP is a modification of the prism PQ shown in FIG. 9A, with the apex areas of the pyramid shapes on the incidence side and emission side cut off, to form flat faces 80, 81 which are dividing portions. When the incident light L1 from the input portion 1 shown in FIG. 1 is made incident on the incidence-side truncated pyramid of the prism PP in FIG. 10A, the incident light which is incident on the four side faces 82 to 85 is split by these side faces 82 to 85 into four rays, and emitted as the four split rays L3a to L3d from the emission-side truncated pyramid, that is, from the side faces 86 to 89 parallel to and opposing the side faces 82 to 85. Incident light which is incident on the flat face 80 in the center propagates rectilinearly without change, and is emitted, parallel to the split rays, from the opposing flat face 81 as the divided light LD. This divided light LD is utilized when using other measurement equipment to monitor the signal light during measurements in the Stokes parameter measurement device. That is, the prism PP of this embodiment, while having substantially the same size as the prism PQ, also has the function of a coupler.

Figure 10B:
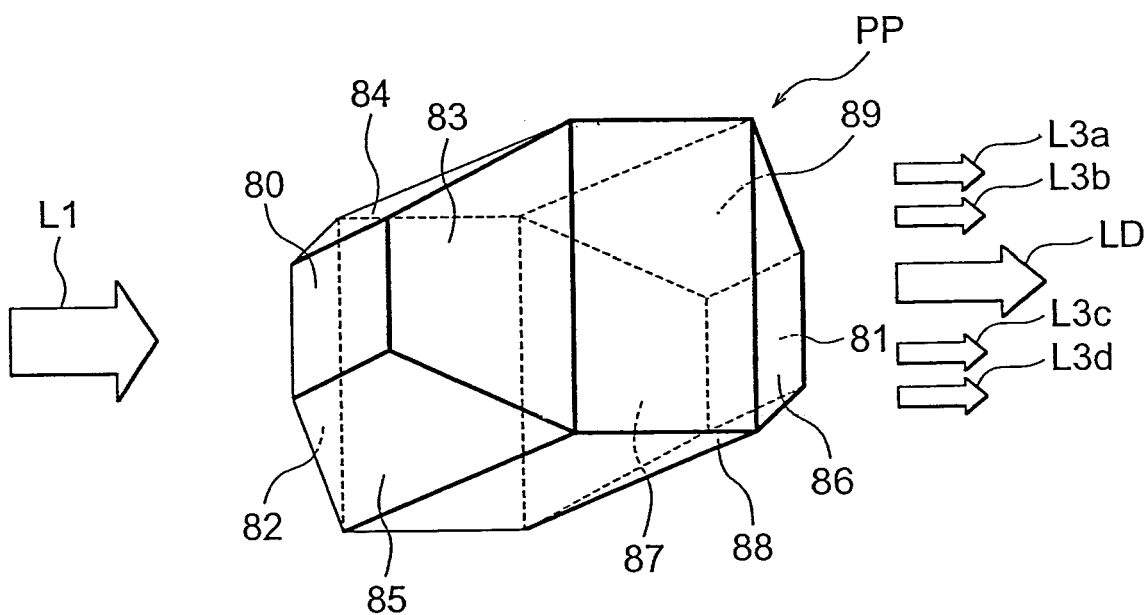

In FIG. 10B, a further variation on the prism PP of FIG. 10A is shown. In this case, a quadrangular column portion is provided between the incidence-side truncated pyramid and the emission-side truncated pyramid. Split light can be obtained with good efficiency according to the refractive index of the prism PP, and in addition the size of the prism PP in the direction perpendicular to the optical path, that is, the axis, can be reduced.

Fifth Embodiment

Below, the Stokes parameter measurement device of a fifth embodiment is explained. The measurement device of the fifth embodiment is another variation on the measurement device of the first embodiment.

Figure 11:
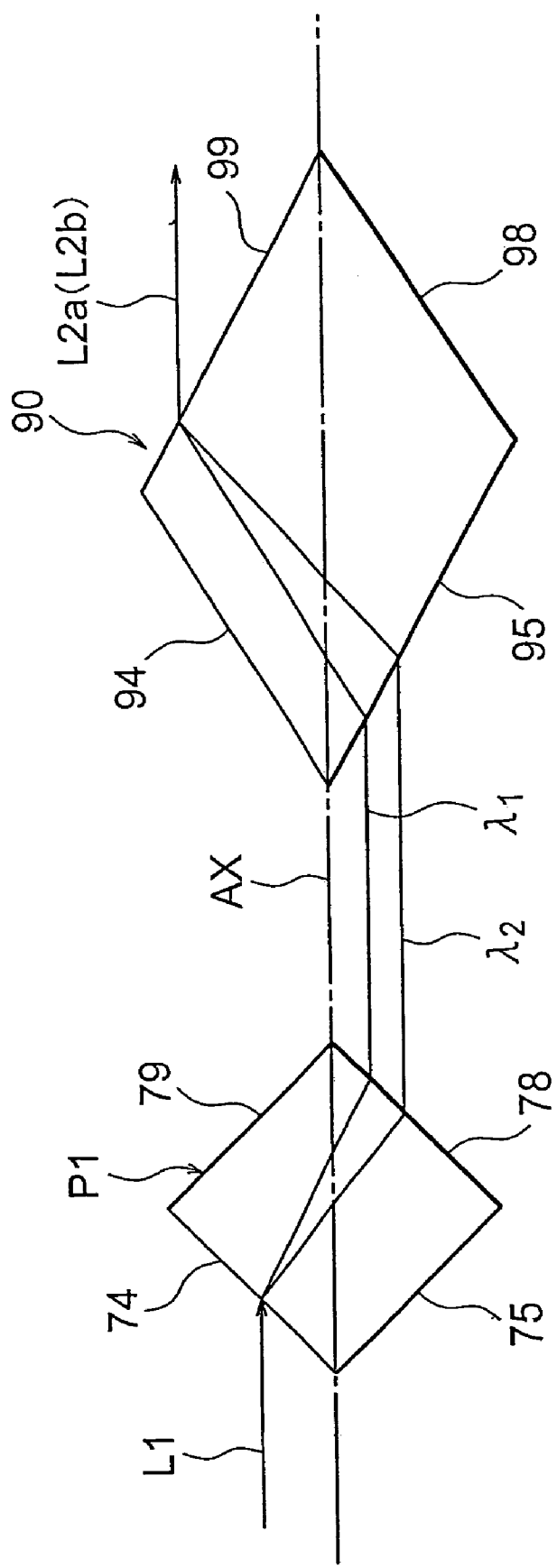
FIG. 11 is a side view explaining the construction of an optical splitter portion of the measurement device of a sixth embodiment of the present invention.

As shown in FIG. 11, an achromatic prism 90, which is a wavelength dispersion correction portion, is added as a later stage of the prism P1 shown in FIG. 2. This achromatic prism 90 is a quadrangular column with a rhomboid cross-section. Also, the pair of apexes of the achromatic prism 90 are positioned on the axis AX passing through the pair of apexes of the prism P1. Also, the refractive index and dimensions of the achromatic prism 90 are adjusted such that split light is emitted from the same position of the achromatic prism 90, regardless of the wavelength of the incident light.

Incident light L1 which is incident on a side face 74 of the prism P1 is emitted as one of the split light rays from the side face 78 parallel to and opposing the side face 74. At this time, due to dispersion in the refractive index of the prism P1, split light with the long wavelength λ1 propagates parallel to the axis AX close to the axis AX, and split light with the short wavelength λ2 propagates parallel to the axis AX far from the axis AX.

Split light emitted from the opposing side face 78 propagates rectilinearly and is incident on the side face 95 of the achromatic prism 90. The split light incident on the side face 95 propagates within the achromatic prism 90, and is output from the side face 99 parallel to and opposing the side face 95 as the split light ray L2a (L2b) propagating parallel to the axis AX. At this time, the refractive index and dimensions of the achromatic prism 90 are adjusted such that the wavelength dependences of the emission position of split light in the prism P1 cancel; hence even when one of a pair of split light rays having different wavelengths λ1, λ2 is incident on the side face 95, split light is emitted from the same place of the opposing side face 99. Though not shown in the figure, split light which is incident on the other side face 75 of the prism P1 and split, and is emitted from the opposing side face 79, on passing from the side face 94 and opposing side face 98 of the achromatic prism 90 to be emitted, also has the wavelength dependence of the emission position canceled. Hence by using such an achromatic prism 90, Stokes parameters can be measured across a plurality of wavelengths without modifying the positions of the phase compensation portion A2 or photodetector circuit portion B1.

The shape of the prism P1 is not limited to that shown in FIG. 11, but need only emit parallel split light. For example, the prism P1 of FIG. 11 may be replaced with prisms of the types shown in FIG. 4A to FIG. 4C.

In the above explanation, the case in which an achromatic prism 90 is positioned in the latter stage of the prism P1 was explained; however, the achromatic prism can also be provided in the latter stage of the two splitting prisms P2, P3 shown in FIG. 2. In this case, the achromatic prism is a quadrangular column prism having the same cross-sectional shape as shown in FIG. 11.

Sixth Embodiment

Below, the Stokes parameter measurement device of a sixth embodiment is explained. The measurement device of the sixth embodiment is a variation on the measurement device of the first embodiment.

Figure 12:
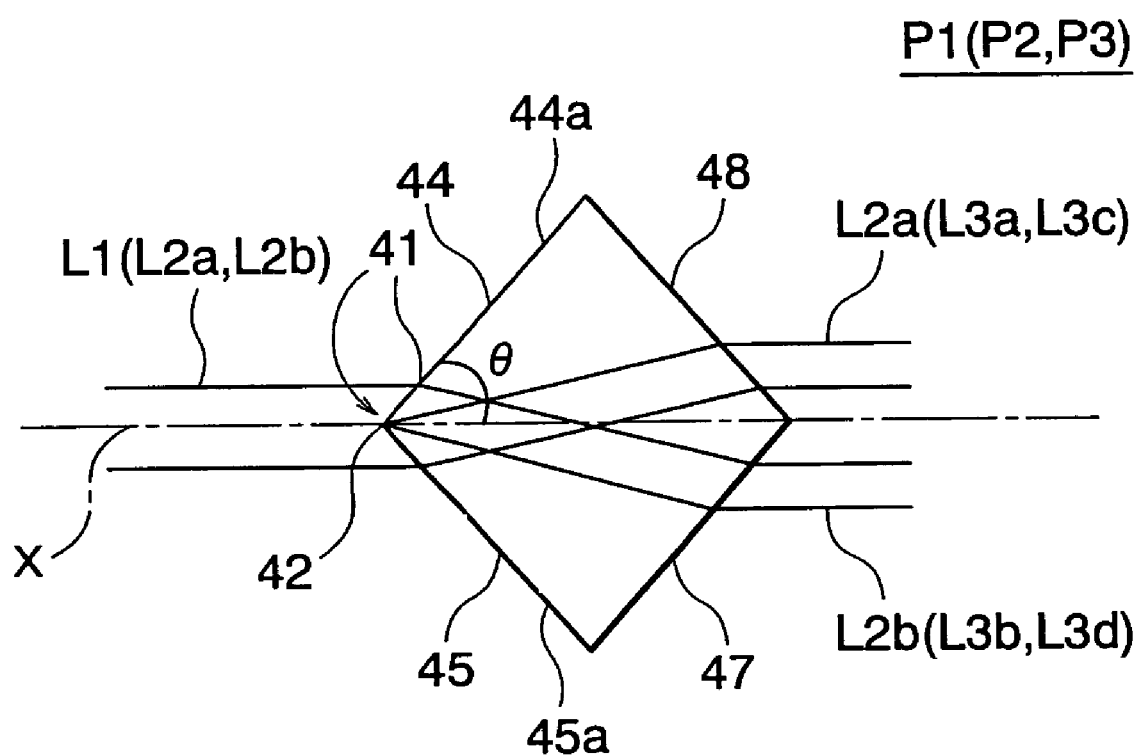
FIG. 12 shows split optical paths within a prism in a sixth embodiment.

FIG. 12 corresponds to FIG. 3. This prism P1 has a cuboid external shape, with a rhomboid cross-section in the plane parallel to the plane of the paper. This prism P1 is formed with parallel opposing faces. Consequently, the emitted light rays are always parallel to the incident light rays, so that it is easy to position polarizers or phase shifter in the phase compensation portion A2 shown in FIG. 2.

In addition, in this prism P1, the angle θ generated by one of the edges 44a, 45b extending form the edge 42 and the optical axis X of the signal light is larger than 45°, or incident angle of the signal light is smaller then 45° That is, the angle θ generated by one of the adjacent and opposing surfaces (or the incidence optical surfaces 44, 45) and the optical axis X of the signal light L1 is larger than 45°; where the angle θ may be larger than 45° and smaller than 90°, and more preferably, the angle θ may be in the range of 50° to 70°. Enlarging the angle θ provides an effect to suppress PDL, however the size of the device has to be enlarged in the direction of the longer side of the prism, that is, the transmission direction of the signal light, for splitting the signal light. Hence, to balance the size of the device with the suppression effect of PDL, it is preferable that the angle θ is in the range of 50° to 70°.

The signal light incident on the apex angle portion 41 of the prism P1, that is, the incident light L1, is incident equally on the pair of incidence optical surfaces or side faces 44, 45 defined by edges 44a, 45b respectively, containing the edge 42 formed in the apex angle portion 41, and is split into two in the plane parallel to the plane of the paper. These two split light rays each propagate along different optical paths within the prism P1, and are emitted separately as light emitted from the pair of opposing side faces 47, 48, that is, as the first split light rays L2a, L2b. The pair of light rays which have been split and are emitted from the opposing side faces 47, 48 are refracted upon emission from the prism P1, becoming parallel to the incident light. The light emitted from the prism P1, that is, the first split light rays L2a, L2b are split at prism P2 or P3 again in a manner similar to that described above. In other words, the above explanation applies to the prism P1; but in the prisms P2 and P3 also, the incident light rays, that is, the first split light rays L2a, L2b are split in a manner similar to that described above, and are emitted as emitted as the second split light rays L3a to L3d.

It is not necessary to set the splitting ratio for signal light in each of the prisms P1 to P3 to 1:1. That is, the beam diameter centers of the incident light L1 and of the first split light rays L2a, L2b need not be positioned so as to be incident on the edge of the apex angles of the respective prisms P1, P2, P3. When the splitting ratio is not 1:1, the splitting ratio is measured in advance, and compensating calibration data corresponding to the splitting ratio is provided to the operation circuit portion B2. That makes it easy to position the respective prisms P1, P2, P3.

Figure 13A:
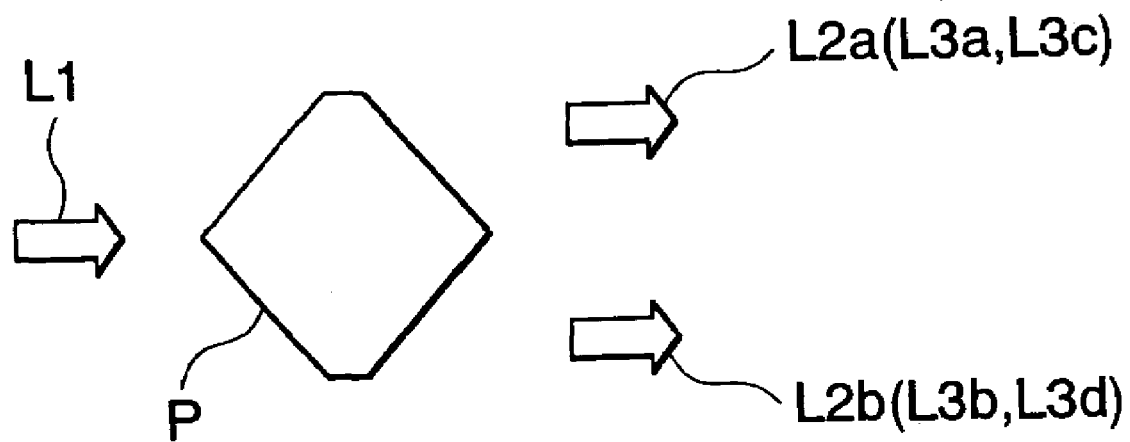
FIGS. 13A and 13B show variations of the prism structure used in the splitter optical path of FIG. 12.
Figure 13B:
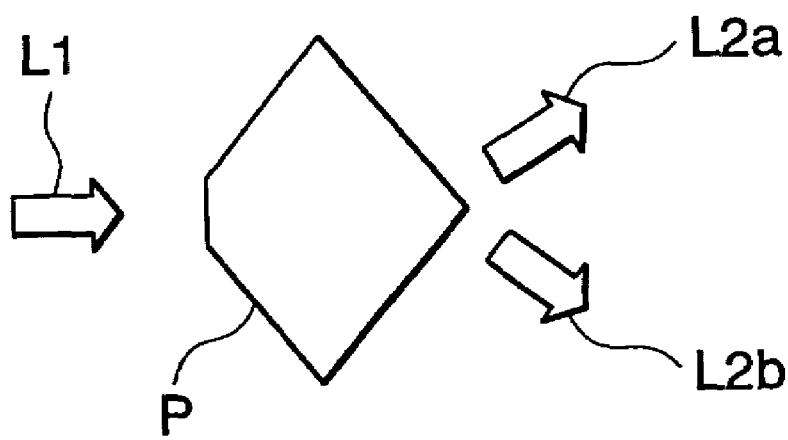

FIGS. 13A and 13B are drawings explaining variations of the prisms P1 to P3 in FIG. 12. That is, the prisms P1 to P3 shown in FIG. 12 are replaced by prisms P shown in FIGS. 13A and 13B.

The prism P shown in FIG. 13A has a shape of a cross-section which is substantially square, but with the corners through which light does not pass removed. Using the shape of the prism in FIG. 13A, the device can be made more compact since spacing of splitter portion can be made narrower. And, the prism P shown in FIG. 13B has a shape in which the apex angle of the incident portion is removed, so that when signal light is emitted from the prism P it is caused to branch into different directions. In other words, the prism P shown in FIG. 13B is formed in order that the angles which are generated by the edges of the emitting side and the optical axis should be 45° or be larger than 45°. More specifically, the angle generated by one of the exit optical surfaces and the optical axis of the signal light L1 is larger than 45°

Figure 14:
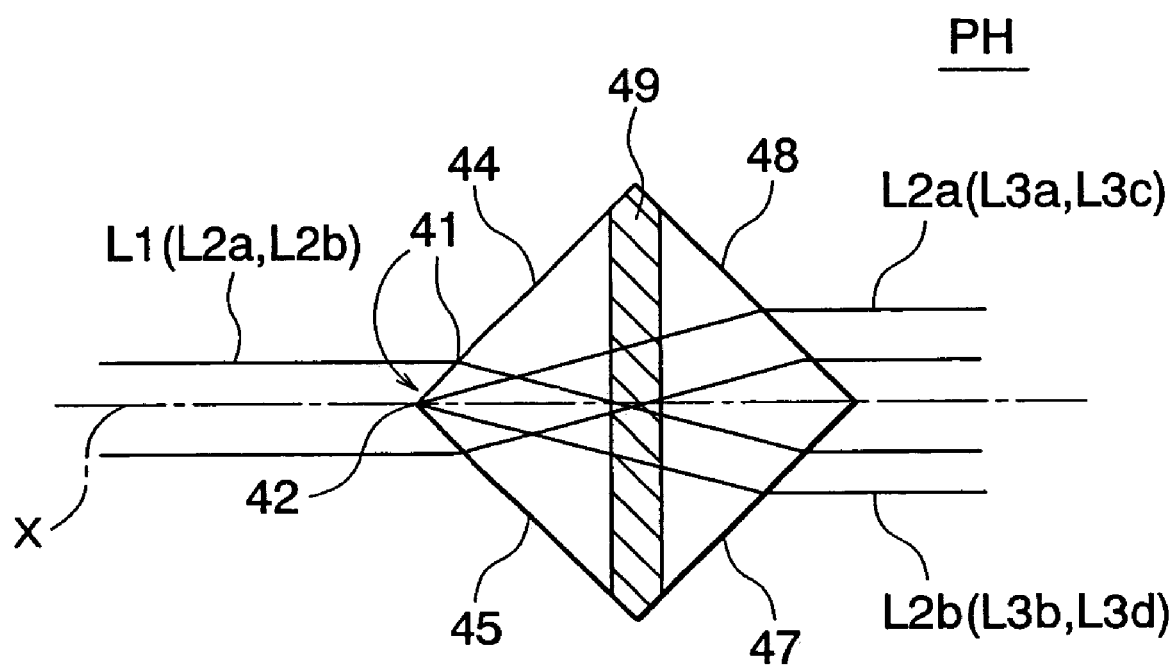
FIG. 14 shows a variation of the prism structure used in the splitter optical path of FIG. 12.

FIG. 14 is a drawing explaining another prism PH which can be replaced by the prisms P1 to P3 in FIG. 12.

As shown in FIG. 14, in the center part along the length (or transmission direction of the light) of the prism PH, the half-wave plate 49 is positioned (inserted). This half-wave plate 49 is positioned such that the optical axis of the half-wave plate 49 makes 45° towards the incident plane of the prism PH. In other words, the half-wave plate 49 is positioned such that the optical axis of the half-wave plate 49 makes 45° towards an intersection line of the incidence optical surface given by the incident light and a plane perpendicular to the incident light. Because of the half-wave plate 49, the states of the polarization can rotate 900 passing through the prism PH from the incident side to the emitting side. One way of positioning the half-wave plate 49 is cutting the center of the prism PH and putting the half-wave plate 49 between the portions of prism PH. Another way of the positioning is preparing two quadrangular-pyramid shaped prism portions in advance. These potions are bonded to each other with the half-wave plate 49 between. Moreover, the half-wave plate 49 can stray from the center part in the longer side direction of the prism PH. In addition, the angle θ generated by the edge 42 and the axis of the signal light may be larger than 45° in the same manner as shown in FIG. 12; though not shown in the FIG. 14.

Seventh Embodiment

Below, the Stokes parameter measurement device of a seventh embodiment is explained. The measurement device of the seventh embodiment is a variation on the measurement device of the sixth embodiment. In the measurement device of the seventh embodiment, the optical splitter portion A1 of FIG. 2 comprises a single prism.

Figure 15A:
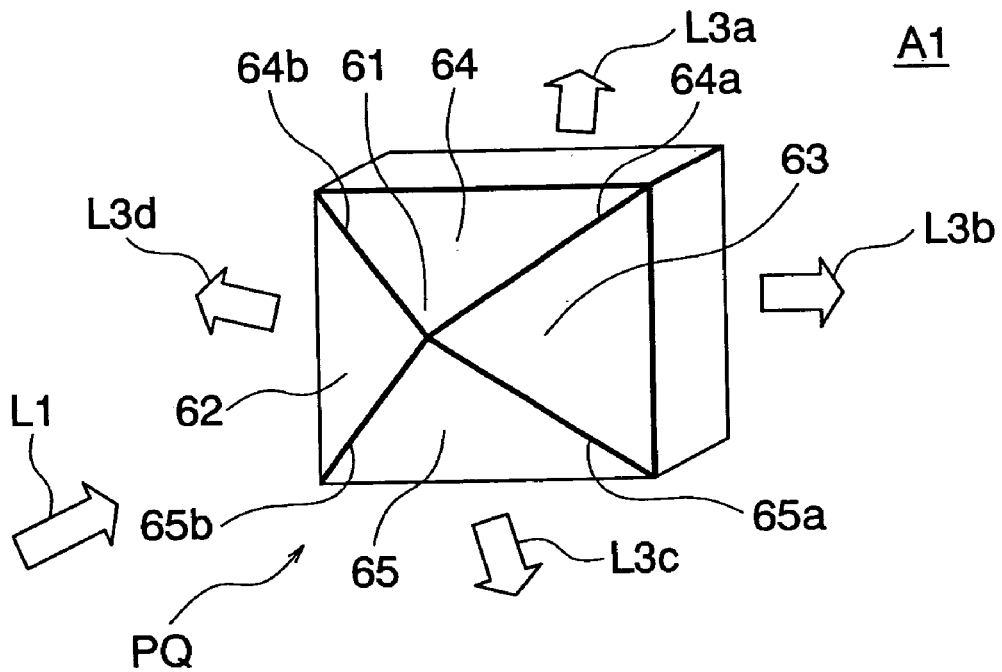
FIG. 15A is a perspective view and FIG. 15B is a side view explaining the construction of the optical splitter portion of the measurement device according to a seventh embodiment of the present invention.
Figure 15B:
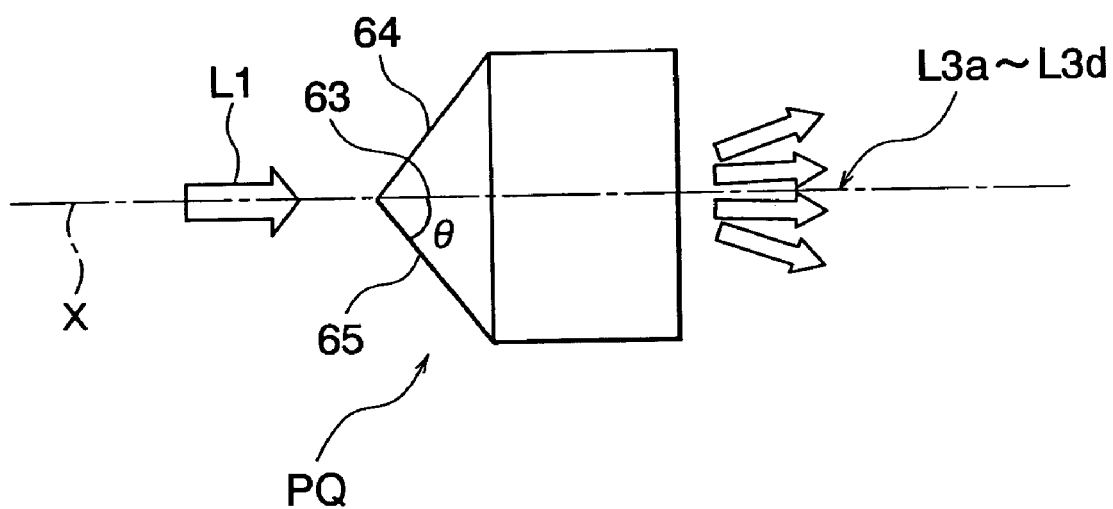

FIG. 15A is a perspective view of the prism PQ composing the optical splitter portion A1, and FIG. 15B is a side view of the prism PQ. In the optical splitter portion A1, the light-receiving portion (or incidence portion of the light L1) of the prism PQ is a quadrangular-pyramid shape. The incident light L1 from the input portion 1 shown in FIG. 1 is incident on the apex portion 61 of this pyramid shape, that is, on the four side faces 62 to 65 containing four edges; as a result, a single prism PQ can split the incident light L1 into four split light rays L3*a* to L3*d* in a single operation. Hence the configuration of the optical splitter portion A1 can be simplified. In this prism PQ, the angle θ generated by each edge, which is a projection of the each edge 64*a*, 64*b* to the optical plane perpendicular to the plane of paper, and the optical axis is larger than 45° as shown in FIG. 15B. More specifically, the angle generated by one of the adjacent and opposing surfaces (or the incidence optical surfaces 62 to 65) and the optical axis of the signal light L1 is larger than 45°. Hence the relationship between the edges and the axis for the angle θ is in a manner similar to that shown in FIG. 12, not to mention providing a similar effect in FIG. 12.

Figure 16A:
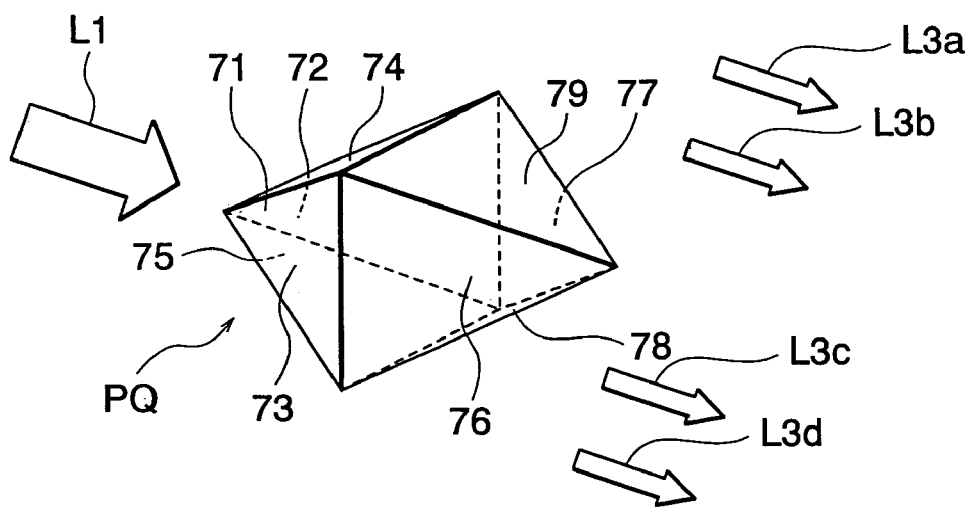
FIGS. 16A and 16B are perspective views showing variations of the construction of an optical splitter portion according to a seventh embodiment of the present invention.

FIG. 16A shows a variation of the prism PQ of FIGS. 15A and 15B. In this case, the incidence side and the emission side of the prism PQ both have a pyramid shape. In this prism PQ, the angle θ generated by each edge, which is a projection of the each edge 64*a*, 64*b* to the optical plane perpendicular to the plane of paper, and the optical axis is larger than 45° respectively. More specifically, the angle generated by each incidence or exit optical surface and the optical axis of the signal light L1 is larger than 45° respectively. Hence the relationship between the edges and the axis for the angle θ is in a manner similar to that shown in FIGS. 15A,15B, not to mention providing a similar effect in FIGS. 15A, 15B.

In this prism PQ, by causing the incident light L1 to be incident on the four side faces 72 to 75 of the apex portion 71, four split light rays L3*a* to L3*d* can be caused to be emitted from the side faces 76 to 79 parallel to and opposing the side faces 72 to 75. At this time, each of the split light rays L3*a* to L3*d* is parallel to the incident light ray L1, so that the design of the Stokes parameter measurement device can be made compact. Also, by using such a prism PQ, the split light rays can be output with the same splitting ratio even when the wavelength of the incident light is changed.

Figure 16B:
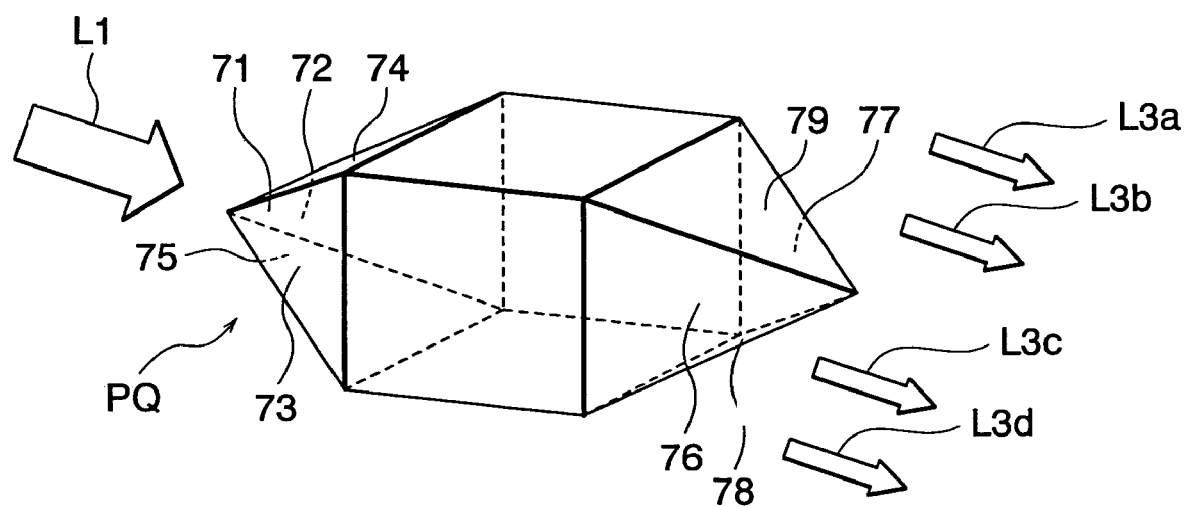

FIG. 16B shows another variation on the prism PQ shown in FIG. 16A. Here, a quadrangular column portion is formed between the pyramid shape on the incidence side and the pyramid shape on the emission side. And in this prism PQ, the angle θ generated by each edge, which is a projection of the each edge 64*a*, 64*b* to the optical plane perpendicular to the plane of paper, and the optical axis is larger than 45° respectively. More specifically, the angle generated by each incidence or exit optical surface and the optical axis of the signal light L1 is larger than 45° respectively. In this case, the prism PQ provides the similar effect shown in FIG. 16A, and moreover, split light rays can be obtained with good efficiency according to the refractive index of the prism PQ, and in addition the size of the prism PQ in the direction perpendicular to the optical path, that is, the axis, can be reduced.

Figure 17A:
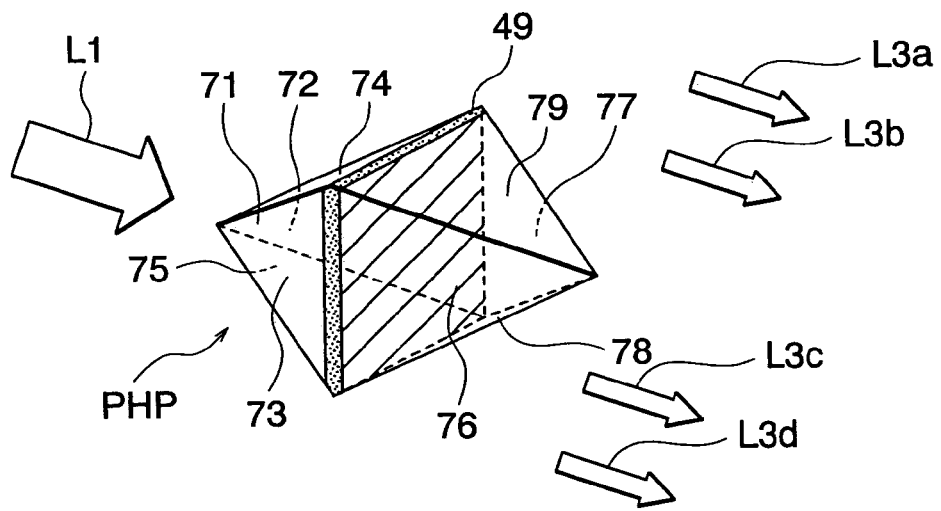
FIGS. 17A and 17B are perspective views showing variations of the construction of an optical splitter portion according to a eighth embodiment of the present invention.
Figure 17B:
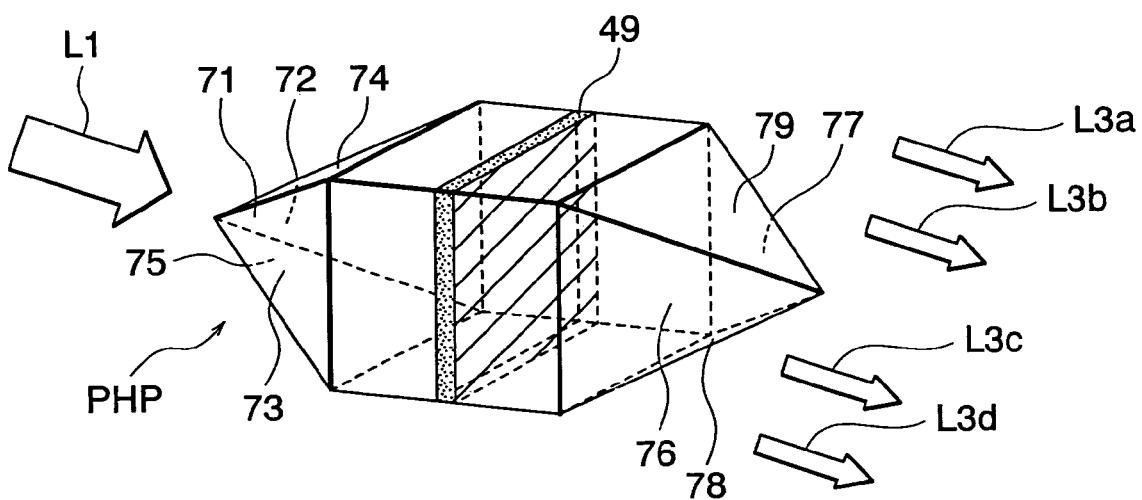

FIGS. 17A and 17B are drawings explaining variations of the prisms. Around the center part along the length of the prisms PHP shown in FIGS. 17A and 17B, the half-wave plates are positioned (inserted) respectively, that is, transmission direction of the light. Because of the half-wave plates, the states of the polarization can rotate 90° as shown in FIG. 14 and the PDL which occurs on the incident surface of the prism can be suppressed.

In addition, the angle θ generated by each edge (or each incidence optical surface) of the prisms PHP shown in FIGS. 17A, 17B and the axis of the signal light may be larger than 45°; though not shown in the figures. In other words, the prisms PHP shown in FIGS. 17A, 17B may combine with the prisms PQ shown in FIGS. 16A, 16B.

Eighth Embodiment

Below, the Stokes parameter measurement device of a eighth embodiment is explained. The measurement device of the eighth embodiment is a variation on the measurement device of the sixth or seventh embodiment.

Figure 18A:
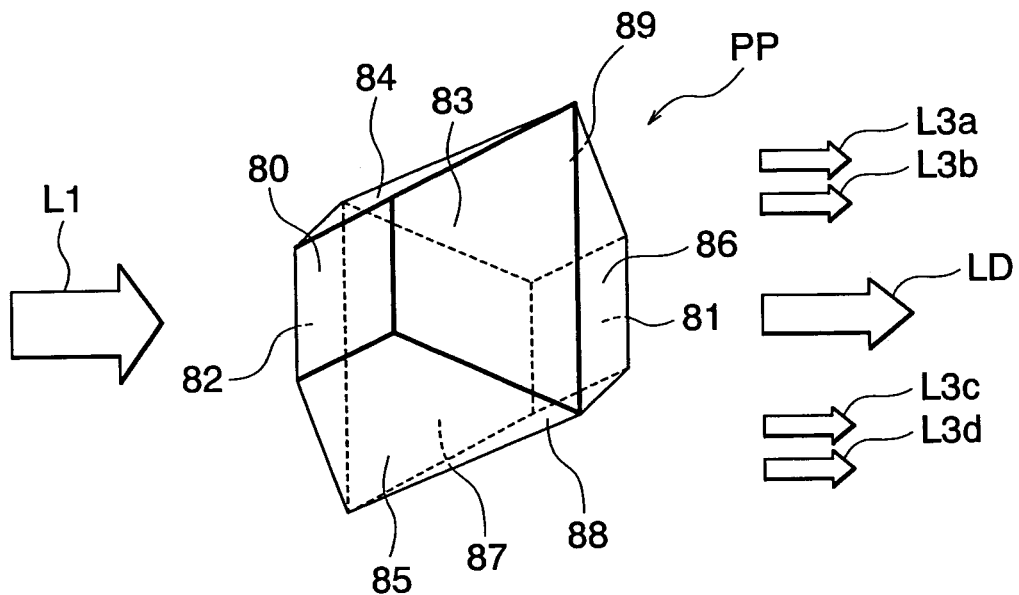
FIGS. 18A and 18B are perspective views explaining the construction of an optical splitter portion of the measurement device according to a eighth embodiment of the present invention; and, FIGS. 19A and 19B are a side view and a front view explaining the construction of the optical splitter portion of a eighth embodiment of the present invention.

In FIG. 18A, the prism PP is a modification of the prism PQ shown in FIG. 16A or the prism PHP shown in FIG. 17A, with the apex areas of the pyramid shapes on the incidence side and emission side cut off, to form flat faces 80, 81 which are dividing portions. When the incident light L1 from the input portion 1 shown in FIG. 1 is made incident on the incidence-side truncated pyramid of the prism PP in FIG. 18A, the incident light which is incident on the four side faces 82 to 85 is split by these side faces 82 to 85 into four rays, and emitted as the four split rays L3*a* to L3*d* from the emission-side truncated pyramid, that is, from the side faces 86 to 89 parallel to and opposing the side faces 82 to 85. Incident light which is incident on the flat face 80 in the center propagates rectilinearly without change, and is emitted, parallel to the split rays, from the opposing flat face 81 as the divided light LD. This divided light LD is utilized when using other measurement equipment to monitor the signal light during measurements in the Stokes parameter measurement device. That is, the prism PP of this embodiment, while having substantially the same size as the prism PQ, also has the function of a coupler. Though not described in the FIG. 18A, the angle θ generated by each edge of the prisms PP (or each incidence or exit optical surface) and the axis of the signal light may be larger than 45° as shown in FIG. 16A, or the half-wave plate may be positioned around the center part of the prism PP in the longer side direction as shown in FIG. 17A.

Figure 18B:
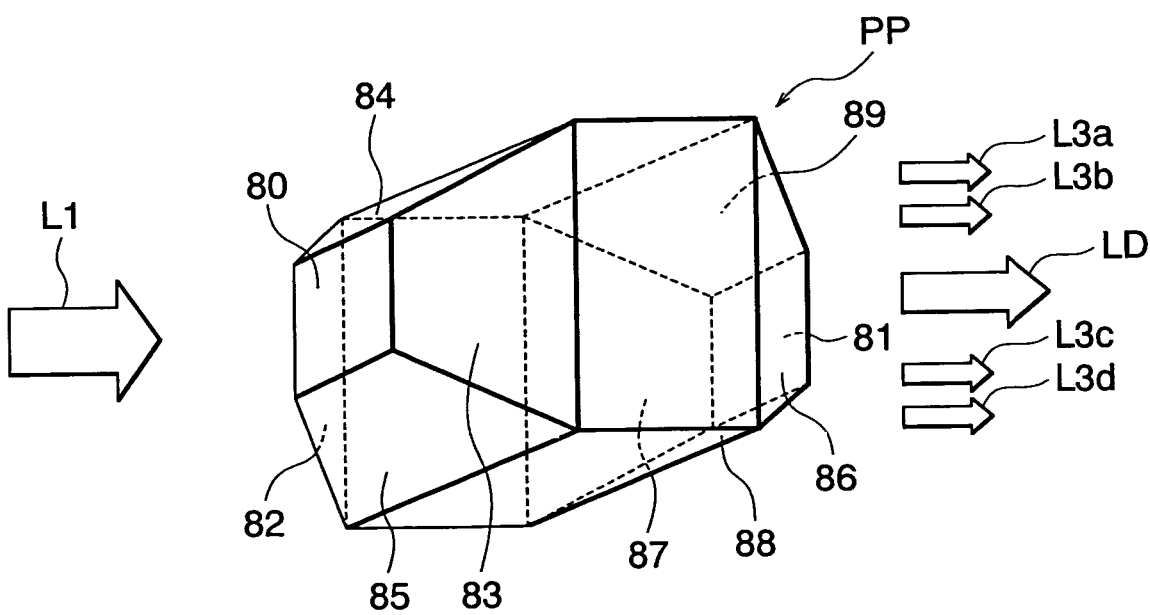

In FIG. 18B, a further variation on the prism PP of FIG. 18A is shown. In this case, a quadrangular column portion is provided between the incidence-side truncated pyramid and the emission-side truncated pyramid. Split light can be obtained with good efficiency according to the refractive index of the prism PP, and in addition the size of the prism PP in the direction perpendicular to the optical path, that is, the axis, can be reduced. Though not described in the FIG. 18B similar to FIG. 18A, the angle θ generated by each edge of the prisms PP (or each incidence or exit optical surface) and the axis of the signal light may be larger than 45° as shown in FIG. 16B, or the half-wave plate may be positioned around the center part of the prism PP in the longer side direction as shown in FIG. 17B.

Ninth Embodiment

Below, the Stokes parameter measurement device of a ninth embodiment is explained. The measurement device of the ninth embodiment is a variation on the measurement device of the seventh embodiment.

Figure 19A:
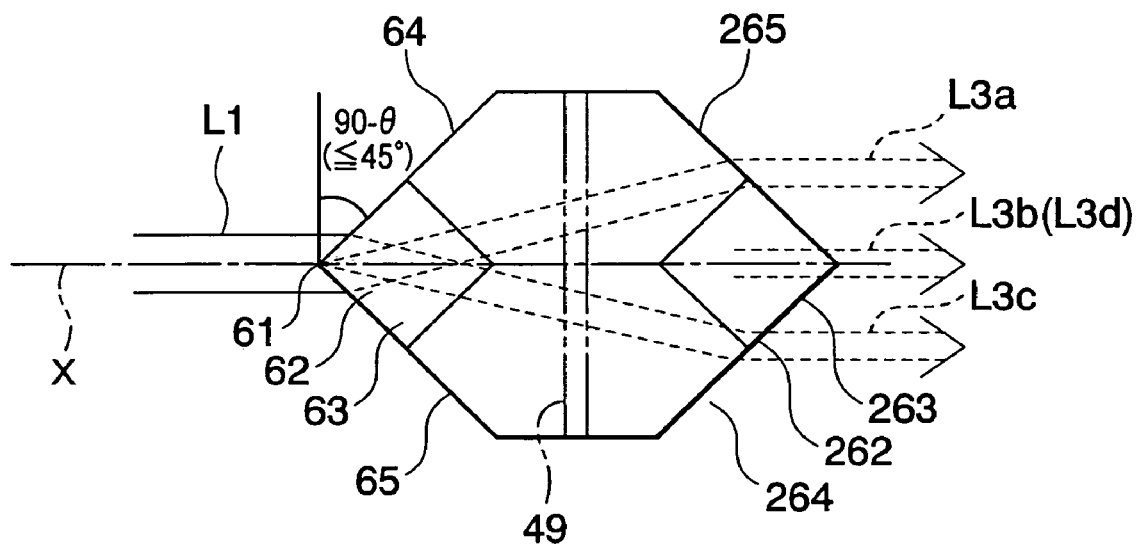
Figure 19B:
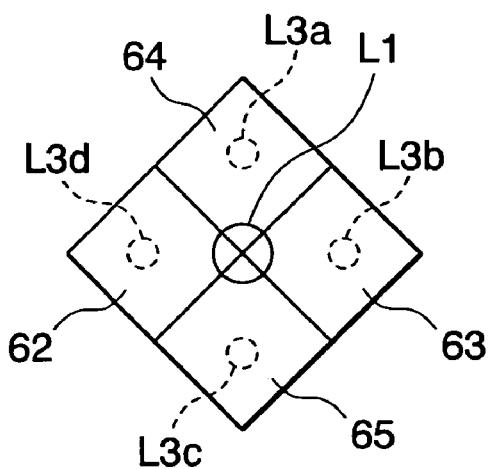

FIG. 19A is a side view of the prism PQ2 composing the optical splitter portion A1, and FIG. 19B is a front view of the prism PQ2. In this prism PQ2, by causing the incident light L1 to be incident on the four side faces 62 to 65 of the apex portion 61, four parallel split rays L3a to L3d can be caused to be emitted from the side faces 262 to 265 parallel to the faces 62 to 65.

In the center part along transmission direction of the light L1 of the prism PQ2, the half-wave plate 49 may be inserted.

Though not described in the sixth embodiment to ninth embodiment, lenses to adjust the beam size may be positioned in the polarization analyzer optical portion A0 and/or the photodetector circuit portion B1 shown in FIG. 2.

For example, in the optical splitter portion A1, a beam expander lens to enlarge the beam diameter of the incident light ray L1 and a collimator lens to cause the incident light ray L1 with enlarged beam diameter to be collimated before incidence on the prism may be positioned.

In addition, placing condensing lenses between the photodetector circuit portion B1 and the phase compensation portion A2, after the second split light rays L3a, L3b, L3c, L3d (refer to FIG. 2) have passed through the phase compensation portion A2, prior to incidence on the photodetector elements E1, E2, E3, E4, the second split light rays L3a, L3b, L3c, L3d are converged by the condensing lenses. By thus positioning these condensing lenses, the light reception efficiency of the photodetector elements E1, E2, E3, E4 is improved, and precision is stabilized.

What is claimed is:

1. A Stokes parameter measurement device, comprising:
   an incidence portion, on which the signal light to be measured is incident;
   an optical splitter portion, which splits signal light which has passed through said incidence portion into at least four rays;
   a phase compensation portion, which endows each of the split signal light rays with different polarizations and phases; and,
   a photodetector circuit portion, which performs photoelectric conversion of the optical component of the signal light rays emitted from the phase compensation portion;
   said optical splitter portion has at least one prism,
   said at least one prism has a plurality of faces containing an edge formed therein, the angles which are generated by said plurality of faces and the optical axis of said signal light are larger than 45° respectively, and
   the signal light, having passed through said incidence portion, is caused to be incident on said plurality of faces to split the signal light.

2. The Stokes parameter measurement device according to claim 1, wherein each one of a pair of edges extending said edge and the optical axis of the optical axis of said signal light generate an angle which is larger than 45° respectively.

3. A Stokes parameter measurement device, comprising:
   an incidence portion, on which the signal light to be measured is incident;
   an optical splitter portion, which splits signal light which has passed through said incidence portion into at least four rays;
   a phase compensation portion, which endows each of the split signal light rays with different polarizations and phases; and,
   a photodetector circuit portion, which performs photoelectric conversion of the optical component of the signal light rays emitted from the phase compensation portion;
   said optical splitter portion has at least one prism,
   said at least one prism has at least one pair of adjacent and opposing faces, the angles which are generated by said at least one pair of adjacent and opposing faces and the optical axis of said signal light are larger than 45° respectively, and
   the signal light, having passed through said incidence portion, is caused to be incident on said at least one pair of adjacent and opposing faces to split the signal light.

4. A Stokes parameter measurement device, comprising:
   an incidence portion, on which the signal light to be measured is incident;
   an optical splitter portion, which splits signal light which has passed through said incidence portion into at least four rays;
   a phase compensation portion, which endows each of the split signal light rays with different polarizations and phases; and,
   a photodetector circuit portion, which performs photoelectric conversion of the optical component of the signal light rays emitted from the phase compensation portion;
   said optical splitter portion has at least one prism, in said at least one prism, a half-wave plate is inserted.

5. The Stokes parameter measurement device according to claim 4, wherein said at least one prism has at least two prism portions provided with said half-wave plate between the prism portions.

6. The Stokes parameter measurement device according to any one of claims 1 to 5, comprising an operation circuit portion which performs operations on the electrical component resulting from photoelectric conversion, to obtain an optical intensity, 0° linear polarization component, 45° linear polarization component, and right circular polarization component, which are the Stokes parameters.

7. A Stokes parameter measurement device, comprising:
   an incidence portion, on which the signal light to be measured is incident;
   an optical splitter portion, which splits signal light which has passed through said incidence portion into at least four rays;
   a phase compensation portion, which endows each of the split signal light rays with different polarizations and phases;
   a photodetector circuit portion, which performs photoelectric conversion of the optical component of the signal light rays emitted from the phase compensation portion; and,
   an operation circuit portion which performs operations on the electrical component resulting from photoelectric conversion, to obtain an optical intensity, 0° linear polarization component, 45° linear polarization component, and right circular polarization component, which are the Stokes parameters;

said optical splitter portion has at least one prism, in said at least one prism, a pair of optical faces are formed, the angle which is generated by each one of said pair of optical faces and the optical axis of said signal light is larger than 45° respectively, and the signal light, having passed through said incidence portion, is caused to be incident on said pair of optical faces to split the signal light.

8. The Stokes parameter measurement device according to any one of claims 1 to 5 and 7, wherein said optical splitter portion comprises at least one prism formed such that opposing faces are parallel.

9. The Stokes parameter measurement device according to any one of claims 1 to 5 and 7, wherein said optical splitter comprises a first splitting portion and a second splitting portion;

the first splitting portion comprises one prism; and the second splitting portion comprises two prisms.

10. The Stokes parameter measurement device according to claim 3 and 4, wherein said optical splitting portion comprises a single prism having a quadrangular-pyramid shaped light-receiving portion on the incidence side, and in which signal light, having passed through said incidence portion, is caused to be incident on the four side faces of the light-receiving portion, to split the signal light into four rays.

11. A Stokes parameter measurement method, in which signal light for measurement is made incident on an incidence portion, comprising the steps of:

splitting the incident signal light by an optical splitting portion comprising at least one prism;

rotating 90° the state of polarization of each split signal light ray;

endowing each signal light ray emitted from the optical splitting portion with a different polarization and phase by a phase compensation portion;

converting the optical components of the signal light rays emitted from the phase compensation portion to photoelectric signals by a photodetector circuit portion;

calculating at least one of the Stokes parameters of the optical intensity, 0° polarization component, 45° polarization component, and right circularly polarized component from the photoelectric signals by an operation circuit portion; and outputting the at least one of the Stokes parameters calculated in the calculating.

12. A Stokes parameter measurement method, in which signal light for measurement is made incident on an incidence portion, comprising the steps of:

splitting the incident signal light by an optical splitting portion comprising at least one prism having a plurality of incident optical faces which angles generated with the optical axis of said signal light are larger than 45° respectively;

endowing each signal light ray emitted from the optical splitting portion with a different polarization and phase by a phase compensation portion;

converting the optical components of the signal light rays emitted from the phase compensation portion to photoelectric signals by a photodetector circuit portion;

calculating at least one of the Stokes parameters of the optical intensity, 0° polarization component, 45° polarization component, and right circularly polarized component from the photoelectric signals by an operation circuit portion; and outputting the at least one of the Stokes parameters calculated in the calculating.

* * * * *